(12) United States Patent
Kim et al.

(10) Patent No.: US 9,281,889 B2
(45) Date of Patent: Mar. 8, 2016

(54) RELAY NODE APPARATUS FOR TRANSMITTING AND RECEIVING SIGNAL ACCORDING TO LINK OPERATION MODE IN WIRELESS COMMUNICATION SYSTEM AND METHOD THEREOF

(75) Inventors: Hak Seong Kim, Anyang-si (KR); Byoung Hoon Kim, Anyang-si (KR); Han Byul Seo, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 13/579,179

(22) PCT Filed: Feb. 16, 2011

(86) PCT No.: PCT/KR2011/001001
§ 371 (c)(1),
(2), (4) Date: Aug. 15, 2012

(87) PCT Pub. No.: WO2011/102631
PCT Pub. Date: Aug. 25, 2011

(65) Prior Publication Data
US 2012/0320819 A1    Dec. 20, 2012

Related U.S. Application Data

(60) Provisional application No. 61/305,116, filed on Feb. 16, 2010, provisional application No. 61/305,542, filed on Feb. 17, 2010.

(51) Int. Cl.
*H04B 7/14* (2006.01)
*H04B 7/155* (2006.01)
(Continued)

(52) U.S. Cl.
CPC .......... *H04B 7/15542* (2013.01); *H04B 7/0417* (2013.01); *H04B 7/0639* (2013.01); *H04L 25/03343* (2013.01); *H04L 5/0007* (2013.01)

(58) Field of Classification Search
CPC .. H04B 7/2606; H04L 1/1825; H04L 5/0087; H04W 72/0426
USPC ......... 370/315, 329, 312, 321, 326, 442, 458, 370/468, 498, 521; 375/260
See application file for complete search history.

(56) References Cited

U.S. PATENT DOCUMENTS

2003/0085798 A1    5/2003    Castro Esteban
2004/0233918 A1    11/2004   Larsson et al.
(Continued)

FOREIGN PATENT DOCUMENTS

KR    10-2006-0113973    11/2006

OTHER PUBLICATIONS

Lin Xiao et al., "Load Based Relay Selection Algorithm for Fairness in Relay Based OFDMA Cellular Systems," Proceedings of IEEE WCNC, Apr. 2009.

*Primary Examiner* — Andrew Lai
*Assistant Examiner* — Mahmudul Hasan
(74) *Attorney, Agent, or Firm* — Lee, Hong, Degerman, Kang & Waimey

(57) ABSTRACT

A relay node (RN) apparatus for transmitting and receiving a signal according to a link mode in a wireless communication system and a method thereof are disclosed. A processor transmits or receives a signal to or from at least one of a base station and a terminal based on link mode information. At least one antenna receive the link mode information and transmit or receive the signal to or from at least one of the base station and the user equipment. The link mode information includes information a link mode in which the relay node apparatus will operate.

17 Claims, 24 Drawing Sheets

(51) Int. Cl.
  *H04B 7/04*   (2006.01)
  *H04B 7/06*   (2006.01)
  *H04L 25/03*  (2006.01)
  *H04L 5/00*   (2006.01)

(56) References Cited

U.S. PATENT DOCUMENTS

| | | | | |
|---|---|---|---|---|
| 2007/0171819 A1* | 7/2007 | Julian | H04W 72/04 | 370/229 |
| 2008/0076433 A1* | 3/2008 | Cheng | H04B 7/2606 | 455/442 |
| 2009/0034458 A1* | 2/2009 | Horn | H04W 88/04 | 370/329 |
| 2009/0147706 A1* | 6/2009 | Yu | H04B 7/15542 | 370/277 |
| 2009/0203309 A1* | 8/2009 | Okuda | | 455/7 |
| 2009/0252083 A1* | 10/2009 | Kang et al. | | 370/315 |
| 2009/0286562 A1* | 11/2009 | Gorokhov | | 455/501 |
| 2010/0008283 A1* | 1/2010 | Chitrapu et al. | | 370/312 |
| 2010/0054171 A1* | 3/2010 | Zhu et al. | | 370/315 |
| 2010/0080166 A1* | 4/2010 | Palanki | H04B 7/2606 | 370/315 |
| 2010/0120442 A1* | 5/2010 | Zhuang | H04B 7/15507 | 455/450 |
| 2010/0135235 A1* | 6/2010 | Ji | H04W 72/082 | 370/329 |
| 2010/0189081 A1* | 7/2010 | Zhang | H04B 7/2606 | 370/336 |
| 2011/0126071 A1* | 5/2011 | Han et al. | | 714/749 |
| 2011/0128883 A1* | 6/2011 | Chung et al. | | 370/252 |
| 2011/0131461 A1* | 6/2011 | Schulz | H04L 1/1819 | 714/749 |
| 2011/0134968 A1* | 6/2011 | Han et al. | | 375/146 |
| 2011/0135020 A1* | 6/2011 | Au-Yeung | H04B 7/0617 | 375/260 |
| 2011/0170489 A1* | 7/2011 | Han et al. | | 370/328 |
| 2011/0211467 A1* | 9/2011 | Bhat | | 370/252 |
| 2011/0228722 A1* | 9/2011 | Noh et al. | | 370/315 |
| 2011/0244787 A1* | 10/2011 | Kim et al. | | 455/7 |
| 2011/0268068 A1* | 11/2011 | Jian et al. | | 370/329 |
| 2011/0281536 A1* | 11/2011 | Lee et al. | | 455/129 |
| 2011/0317614 A1* | 12/2011 | Park et al. | | 370/315 |
| 2012/0002750 A1* | 1/2012 | Hooli et al. | | 375/295 |
| 2012/0015662 A1* | 1/2012 | Zhang et al. | | 455/445 |
| 2012/0087335 A1* | 4/2012 | Baligh et al. | | 370/330 |
| 2012/0163287 A1* | 6/2012 | Raaf | H04B 7/155 | 370/315 |
| 2012/0236798 A1* | 9/2012 | Raaf | H04B 7/0452 | 370/328 |
| 2012/0250604 A1* | 10/2012 | Lindholm | H04W 84/047 | 370/315 |

\* cited by examiner (a)

(b)

(a)

(b)

$f_1$ : Downlink Carrier     $a_1$ : Antenna#1

$f_2$ : Uplink Carrier     $a_2$ : Antenna#2

(a)

$f_1$ : Downlink Carrier     $a_1$ : Antenna#1

$f_2$ : Uplink Carrier     $a_2$ : Antenna#2

(b)

RELAY NODE APPARATUS FOR TRANSMITTING AND RECEIVING SIGNAL ACCORDING TO LINK OPERATION MODE IN WIRELESS COMMUNICATION SYSTEM AND METHOD THEREOF

CROSS-REFERENCE TO RELATED APPLICATIONS

This application is the National Stage filing under 35 U.S.C. 371 of International Application No. PCT/KR2011/001001, filed on Feb. 16, 2011, which claims the benefit of U.S. Provisional Application Ser. No. 61/305,116, filed on Feb. 16, 2010 and U.S. Provisional Application Ser. No. 61/305,542, filed on Feb. 17, 2010, the contents of which are all incorporated by reference herein in their entirety.

TECHNICAL FIELD

The present invention relates to a wireless communication system, and more particularly, to a method for transmitting and receiving a signal according to a link operation mode of a relay node.

BACKGROUND ART

In a 3rd Generation Partnership Project Long Term Evolution-Advanced (3GPP LTE-A) system which is a next-generation communication system, a relay node for forwarding link connection between a base station (BS) and a user equipment (UE) has been introduced, two links having different attributes are respectively applied to uplink and downlink carrier frequency bands. A connection link set between a base station and a relay node is defined as a backhaul link. Frequency Division Duplex (FDD) or Time Division Duplex (TDD) transmission using downlink resources is referred to as backhaul downlink and FDD or TDD transmission using uplink resources is referred to as backhaul uplink.

A relay node may receive information from a base station through relay backhaul downlink and transmit information to a base station through relay backhaul uplink. The relay node may transmit information to a terminal through relay access downlink and receive information from a terminal through relay access uplink.

In the 3GPP LTE-A system using the relay node, a method of transmitting and receiving a signal according to a link mode at a relay node supporting a Multiple Input Multiple Output (MIMO) scheme is not disclosed.

DISCLOSURE OF INVENTION

Technical Problem

An object of the present invention devised to solve the problem lies on a method for transmitting and receiving a signal according to a link mode at a relay node in a wireless communication system.

Another object of the present invention devised to solve the problem lies on a relay apparatus for transmitting and receiving a signal according to a link mode in a wireless communication system.

Solution to Problem

The object of the present invention can be achieved by providing a method for transmitting and receiving a signal at a relay node (RN) according to a link mode in a wireless communication system, including receiving link mode information including information about a link mode in which the relay node will operate, and transmitting the signal to at least one of a base station (BS) and a user equipment (UE) based on the received link mode information or receiving the signal from at least one of the base station and the user equipment.

The link mode information may include information about the link mode in which the relay node will operate per specific time unit.

The method may further include switching to a link mode indicated by the received link mode information in a specific time unit, and the signal may be transmitted to or received from at least one of the base station and the user equipment in the specific time unit according to the switched link mode.

If the received link mode information indicates a first mode in a specific time unit, the signal may be transmitted to or received from only the base station in the specific time unit.

If the received link mode information indicates a second mode in a specific time unit, the signal may be transmitted to or received from only the user equipment in the specific time unit.

If the received link mode information indicates a third mode in a specific time unit, the signal may be transmitted to the base station and the user equipment using respective links in the specific time unit.

If the received link mode information indicates a fourth mode in a specific time unit, the signal may be received from the base station and the user equipment using respective links in the specific time unit.

The link mode information may further include information indicating a predefined codebook table corresponding to the number of uplink or downlink transmission antennas of the relay node or information indicating a feedback mode corresponding to the number of downlink transmission or downlink reception antennas of the relay node. The method may further include selecting a Precoding Matrix Index (PMI) based on the codebook table indication information, and the signal to which the selected PMI is applied may be transmitted to at least one of the base station and the user equipment.

The number of antennas per link mode indicated by the link mode information may be predefined. The number of antenna indexes per link mode indicated by the link mode information may be predefined. The link mode information may be received through higher layer signaling.

In another aspect of the present invention, provided herein is a relay node (RN) apparatus for transmitting and receiving a signal according to a link mode in a wireless communication system, including a processor configured to transmit or receive the signal to or from at least one of a base station and a user equipment based on link mode information, and at least one antenna configured to receive the link mode information and transmit or receive the signal to or from at least one of the base station and the user equipment, wherein the link mode information includes information about a link mode in which the relay node apparatus will operate.

The processor may control switching to a link mode to be used in a specific time unit based on the received link mode information, and the at least one antenna may transmit or receive the signal to or from at least one of the base station and the user equipment according to the switched link mode.

If the received link mode information indicates a first mode in a specific time unit, the processor may control the at least one antenna to transmit or receive the signal to or from only the base station using a link in the specific time unit, and the at least one antenna may transmit or receive the signal to or from only the base station.

If the received link mode information indicates a second mode in a specific time unit, the processor may control the at least one antenna to transmit or receive the signal to or from only the terminal using a link in the specific time unit, and the at least one antenna may transmit or receive the signal to or from only the user equipment through the link.

If the received link mode information indicates a third mode in a specific time unit, the processor may control the at least one antenna to transmit the signal to the base station and the user equipment using respective links in the specific time unit, and the one or more antennas may transmit the signal to the base station and the user equipment through the respective links.

If the received link mode information indicates a fourth mode in a specific time unit, the processor may control the at least one antenna to receive the signal from the base station and the user equipment using respective links in the specific time unit, and the at least one antenna may receive the signal from the base station and the user equipment through the respective links.

The link mode information may further include information indicating a predefined codebook table corresponding to the number of uplink or downlink transmission antennas of the relay node or information indicating a feedback mode corresponding to the number of downlink transmission or downlink reception antennas of the relay node.

The processor may select a Precoding Matrix Index (PMI) based on the codebook table indication information, and the one or more antennas may transmit the signal, to which the selected PMI is applied, to at least one of the base station and the user equipment.

Advantageous Effects of Invention

According to various embodiments of the present invention, since a relay node can transmit and receive a signal in various link operation modes, it is possible to improve communication performance.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Hereinafter, the preferred embodiments of the present invention will be described with reference to the accompanying drawings. It is to be understood that the detailed description which will be disclosed with reference to the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a 3rd Generation Partnership Project (3GPP) Long Term Evolution (LTE) system, but the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts. The exemplary embodiment of the specification is not in any way preferable to other embodiments.

In the following description, it is assumed that a terminal includes a mobile or fixed user end device such as a user equipment (UE), a mobile station (MS) and an Advanced Mobile Station (AMS), and a base station includes a node of a network end communicating with a terminal, such as a Node-B, an eNode B, a base station, and an Access Point (AP). Relay node may be referred as relay station.

In a mobile communication system, a UE or a relay node may receive information from a base station through downlink/backhaul downlink and transmit information uplink/backhaul uplink. The information transmitted or received by the UE or the relay node includes data and a variety of control information, and a variety of physical channels is present according to the type and usage of information transmitted or received by the UE or the relay node.

Although a wireless communication system including one eNB, one UE, and one relay node is shown for simplicity, the wireless communication system 200 may include one or more eNBs, one or more relay nodes and/or one or more UEs. That is, the base station includes various eNBs such as a macro eNB and a femto eNB and the UE includes various UEs such as a macro UE and a femto UE.

Figure 1:
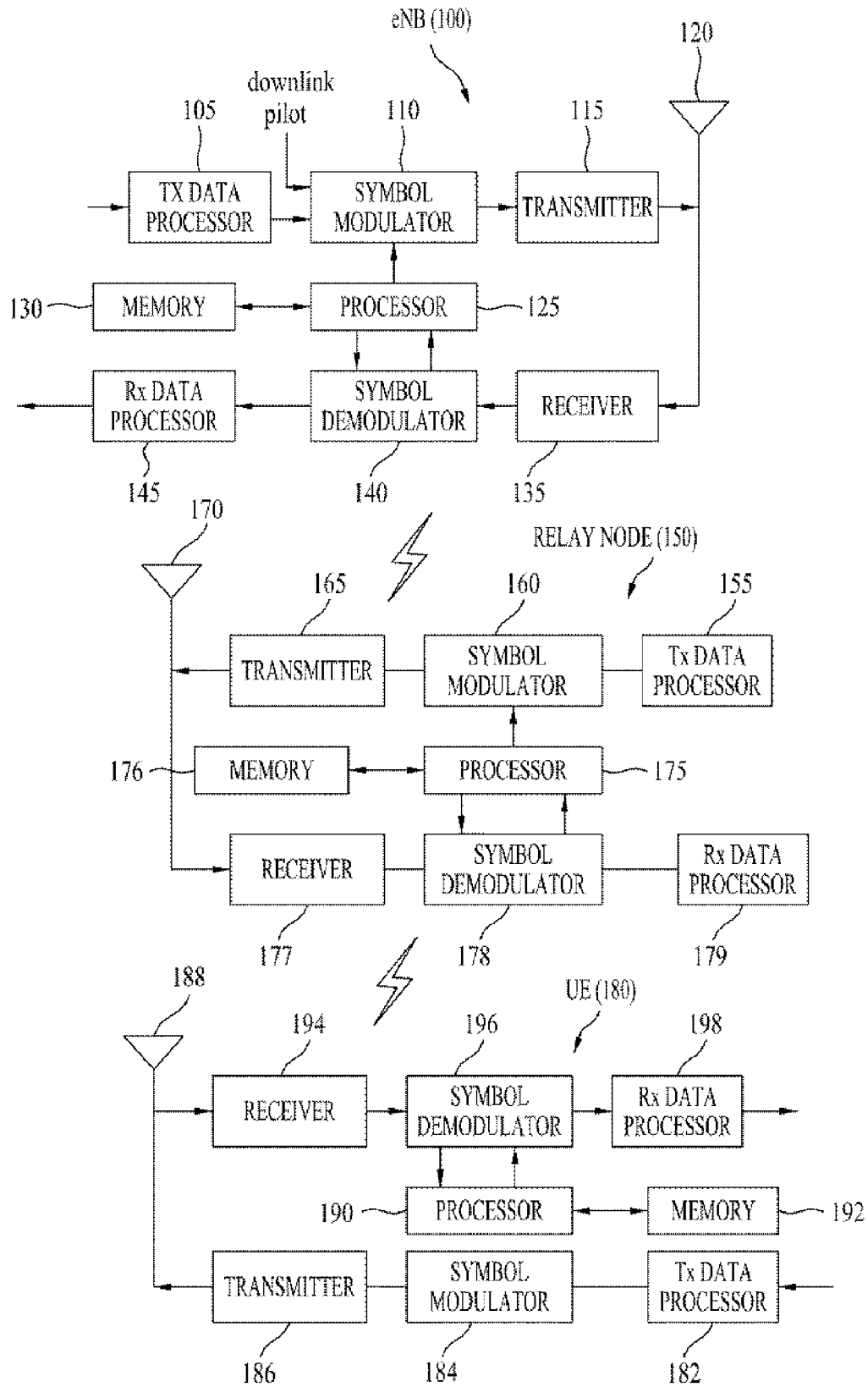
FIG. 1 is a block diagram showing the configuration of a communication system according to the present invention.

FIG. 1 is a block diagram showing the configuration of a communication system according to the present invention.

The communication system according to the present invention may include an eNB 100, a relay node 150, a UE 80 and a network (not shown). Although the communication system including one eNB 100, one relay node 200 and one UE 300 is shown for simplicity, the communication system according to the present invention may include a plurality of eNBs, a plurality of relay nodes, and a plurality of UEs.

Referring to FIG. 1, the eNB 100 may include a transmission (Tx) data processor 105, a symbol modulator 110, a transmitter 115, a transmission/reception antenna 120, a processor 125, a memory 130, a receiver 135, a symbol demodulator 140, and a reception (Rx) data processor 145. The relay node 150 may include a Tx data processor 155, a symbol modulator 160, a transmitter 165, a transmission/reception antenna 170, a processor 175, a memory 176, a receiver 177, a symbol demodulator 178 and an Rx data processor 179. In addition, the UE 180 may include a Tx data processor 182, a symbol modulator 184, a transmitter 186, a transmission/reception antenna 188, a processor 190, a memory 192, a receiver 194, a symbol demodulator 196 and an Rx data processor 198.

Although one antenna 120, 170 or 188 is included in the eNB 100, the relay node 150 or the UE 180, a plurality of antennas may be included in the eNB 100, the relay node 150 or the UE 180. Accordingly, the eNB 100, the relay node 150 and the UE 180 according to the present invention supports Multiple Input Multiple Output (MIMO). The eNB 100, the relay node 150 and the UE 180 according to the present invention may support both Single User (SU)-MIMO and Multi User (MU)-MIMO.

In downlink, the Tx data processor 105 of the eNB 100 receives traffic data, formats and codes the received traffic data, interleaves and modulates (or symbol-maps) the coded traffic data, and provides modulated symbols (data symbols). The symbol modulator 110 receives and processes the data symbols and pilot symbols and provides a symbol stream. The symbol modulator 110 of the eNB 100 multiplexes data and pilot symbols and transmits the multiplexed data to the transmitter 115. At this time, each transmitted symbol may be a data symbol, a pilot symbol or a zero (null) signal value. In each symbol period, pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols. The transmitter 115 of the eNB 100 receives the symbol stream, converts the symbol stream into one or more analog signals, additionally adjusts (for example, amplifies, filters, frequency up-converts) the analog signals, and generates a downlink signal suitable for transmission through a radio channel. Subsequently, the downlink signal is transmitted to the relay node 150 and/or the UE 180 through the antenna 120.

The reception antenna 170 of the relay node 150 receives a downlink signal from the eNB 100 and/or an uplink signal from the UE 180 and provides the received signal to the receiver 177. The receiver 177 adjusts (for example, filters, amplifies, and frequency down-converts) the received signal, digitizes the adjusted signal, and acquires samples. The symbol demodulator 178 demodulates the received pilot symbols and provides the demodulated symbols to the processor 175, for channel estimation.

The processor 175 of the relay node 150 may demodulate and process the downlink/uplink signal received from the eNB 100 and/or the UE 180 and transmit the signal to the UE 180 and/or the eNB 100.

In the UE 180, the antenna 188 receives the downlink signal from the eNB 100 and/or the relay node 150 and provides the received signal to the receiver 194. The receiver 194 adjusts (for example, filters, amplifies, and frequency down-converts) the received signal, digitizes the adjusted signal, and acquires samples. The symbol demodulator 198 demodulates the received pilot symbols and provides the pilot signals to the processor 190, for channel estimation.

The symbol demodulator 196 receives a frequency response estimation value for downlink from the processor 190, performs data demodulation with respect to the received data symbols, acquires data symbol estimation values (which are estimation values of the transmitted data symbols), and provides the data symbol estimation values to the Rx data processor 198. The Rx data processor 150 demodulates (that is, symbol-demaps), deinterleaves and decodes the data symbol estimation values and restore the transmitted traffic data.

The processes by the symbol demodulator 196 and the Rx data processor 198 are complementary to the processes by the symbol modulator 110 and the Tx data processor 105 of the eNB 100.

In the UE 180, the Tx data processor 182 processes traffic data and provides data symbols in uplink. The symbol modulator 184 receives the data symbols, multiplexes the data symbols with pilot symbols, performs modulation, and provides a symbol stream to the transmitter 186. The transmitter 186 receives and processes the symbol stream, generates an uplink signal, and transmits the uplink signal to the eNB 100 or the relay node 150 through the antenna 135.

In the eNB 100, the uplink signal is received from the UE 100 and/or the relay node 150 through the antenna 130. The receiver 190 processes the received uplink signal and acquires samples. Subsequently, the symbol demodulator 195 processes the samples and provides pilot symbols and data symbol estimation values received in uplink. The Rx data processor 197 processes the data symbol estimation values and restores the traffic data transmitted from the UE 180 and/or the relay node 150.

The respective processors 125, 175 and 190 of the eNB 100, the relay node 150 and the UE 180 instruct (for example, control, adjust, or manage) the operations of the eNB 100, the relay node 150 and the UE 180, respectively. The processors 125, 175 and 190 may be connected to the memories 130, 176 and 192 for storing program codes and data, respectively. The memories 130, 176 and 192 are respectively connected to the processors 125, 175 and 190 so as to store operating systems, applications and general files.

The processors 125, 175 and 190 may be called controllers, microcontrollers, microprocessors, microcomputers, etc. The processors 125, 175 and 190 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 125, 175 and 190.

If the embodiments of the present invention are implemented by firmware or software, the firmware or software may be configured to include modules, procedures, functions, etc. for performing the functions or operations of the present invention. The firmware or software configured to perform the present invention may be included in the processors 125, 175 and 190 or may be stored in the memories 130, 176 and 192 so as to be driven by the processors 125, 175 and 190.

Layers of the radio interface protocol between the eNB 100, the relay node 150 and the UE 180 in the wireless communication system (network) may be classified into a first layer (L1), a second layer (L2) and a third layer (L3) based on the three low-level layers of the known Open System Interconnection (OSI) model of a communication system. A physical layer belongs to the first layer and provides an information transport service through a physical channel. A Radio Resource Control (RRC) layer belongs to the third layer and provides control radio resources between the UE 180 and the network. The eNB 100, the relay node 150 and the UE 180 exchange RRC messages with each other through a wireless communication network and the RRC layer.

Figure 2:
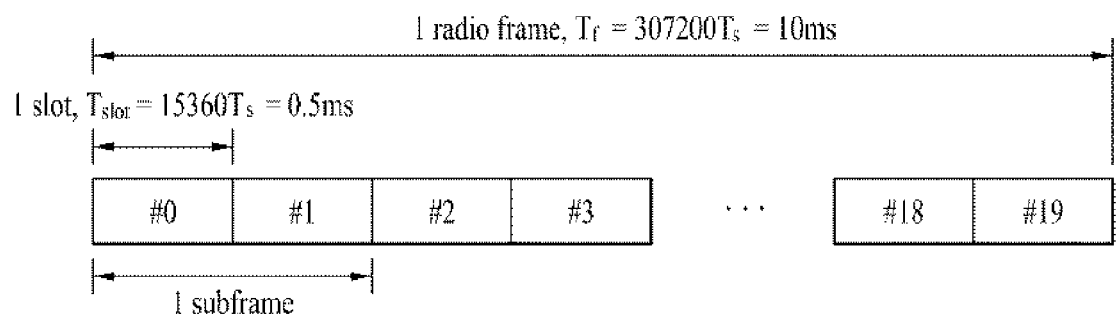
FIG. 2 is a diagram showing the structure of a radio frame used in a 3GPP LTE system which is an example of a mobile communication system.

FIG. 2 illustrates the structure of a radio frame in a 3rd Generation Partnership Project (3GPP) Long Term Evolution (LTE) system as an example of a mobile communication system.

Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 3:
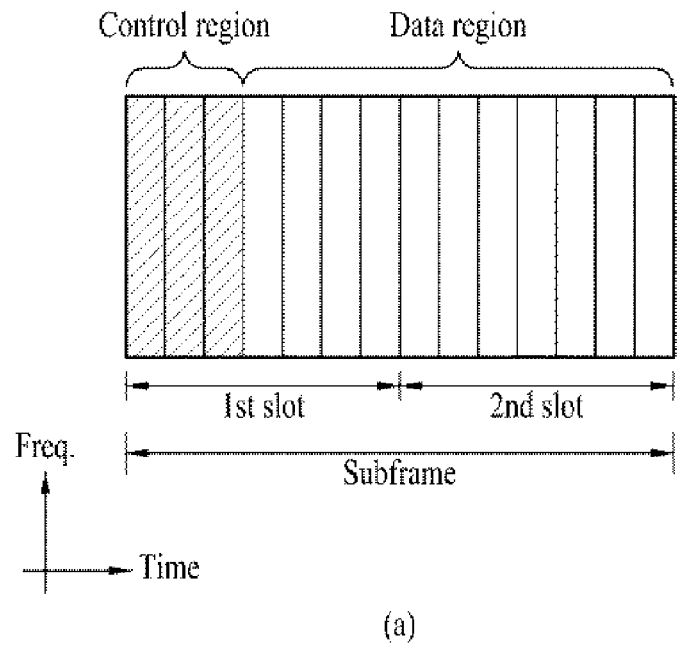
FIG. 3 is a diagram showing the structures of downlink and uplink subframes of a 3GPP LTE system which is an example of a mobile communication system.
Figure 3:
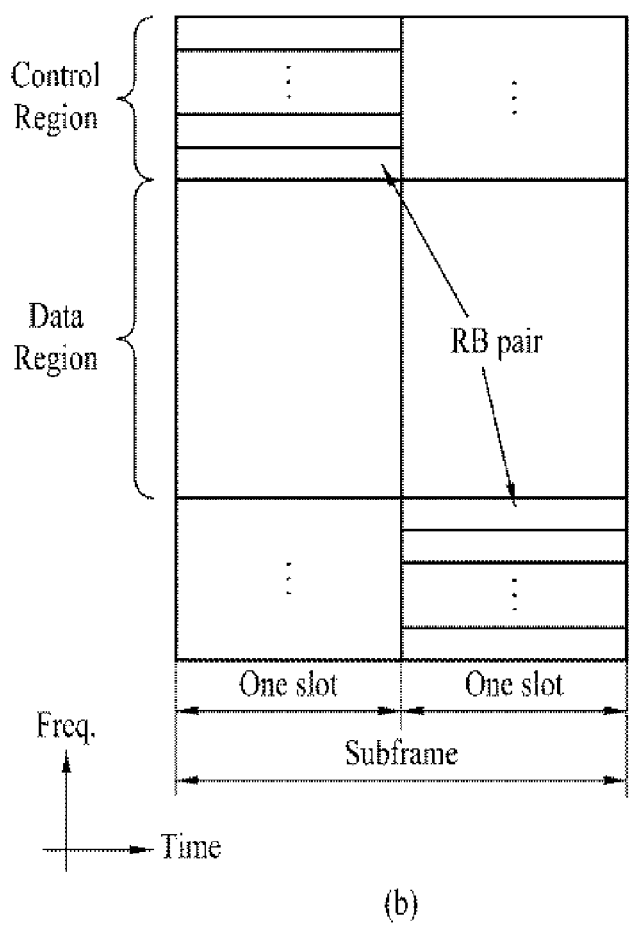

FIG. 3 illustrates the structures of downlink and uplink subframes in the 3GPP LTE system.

Referring to the FIG. 3(a), a maximum of three OFDM symbols located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

Now, a PDCCH that is a downlink physical channel will be described.

The PDCCH can carry a PDSCH's resource assignment and transport format (referred to as a downlink grant), PUSCH's resource assignment information (referred to as an uplink grant), a transmit power control command for individual UEs within any UE group, activation of a voice over Internet (VoIP), etc. A plurality of PDCCHs can be transmitted in a control region, and the UE can monitor the plurality of PDCCHs. The PDCCH consists of an aggregation of one or several consecutive control channel elements (CCEs). The PDCCH consisting of the aggregation of one or several consecutive CCEs can be transmitted on a control region after being processed with subblock interleaving. The CCE is a logical assignment unit used to provide the PDCCH with a coding rate depending on a wireless channel condition. The CCE corresponds to a plurality of resource element groups. According to an association relation between the number of CCEs and a coding rate provided by the CCEs, a format of the PDCCH and the number of bits of an available PDCCH are determined.

Control information transmitted over the PDCCH is referred to as downlink control information (DCI). The following table shows the DCI according to a DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

A DCI format 0 indicates uplink resource assignment information. DCI formats 1 to 2 indicate downlink resource assignment information. DCI formats 3 and 3A indicate an uplink transmit power control (TPC) command for any UE groups.

A method for allowing a BS to perform resource mapping for PDCCH transmission in the 3GPP LTE system will hereinafter be described in detail.

Generally, the BS may transmit scheduling allocation information and other control information over the PDCCH. Information about a physical control channel (PCCH) is configured in the form of one aggregate (one aggregation) or several CCEs, such that the resultant information is transmitted as one aggregate or several CCEs. Namely, a PDCCH transmission unit of the BS is a CCE. One CCE includes 9 resource element groups (REGs). The number of RBGs unallocated to either Physical Control Format Indicator Channel (PCFICH) or Physical Hybrid Automatic Repeat Request Indicator Channel (PHICH) is NREG. CCEs from 0 to NCCE-1 may be available to a system (where, $N_{CCE}=\lfloor N_{REG}/9 \rfloor$). PDCCH supports multiple formats as shown in the following Table 3. One PDCCH composed of n contiguous CCEs begins with a CCE having 'i mod n=0' (where 'i' is a CCE number). Multiple PDCCHs may be transmitted through one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, a base station (BS) may decide a PDCCH format according to how many regions are required for the BS to transmit control information. The UE reads control information and the like in units of a CCE, resulting in reduction of overhead. Likewise, the relay node (RN) may also read control information and the like in units of a Relay-CCE (R-CCE). In the LTE-A system, in order to allow the BS to transmit R-PDCCH information for an arbitrary RN, a resource element (RE) may be mapped in units of a Relay-Control Channel Element (R-CCE).

Referring to the FIG. 3(b), an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 4:
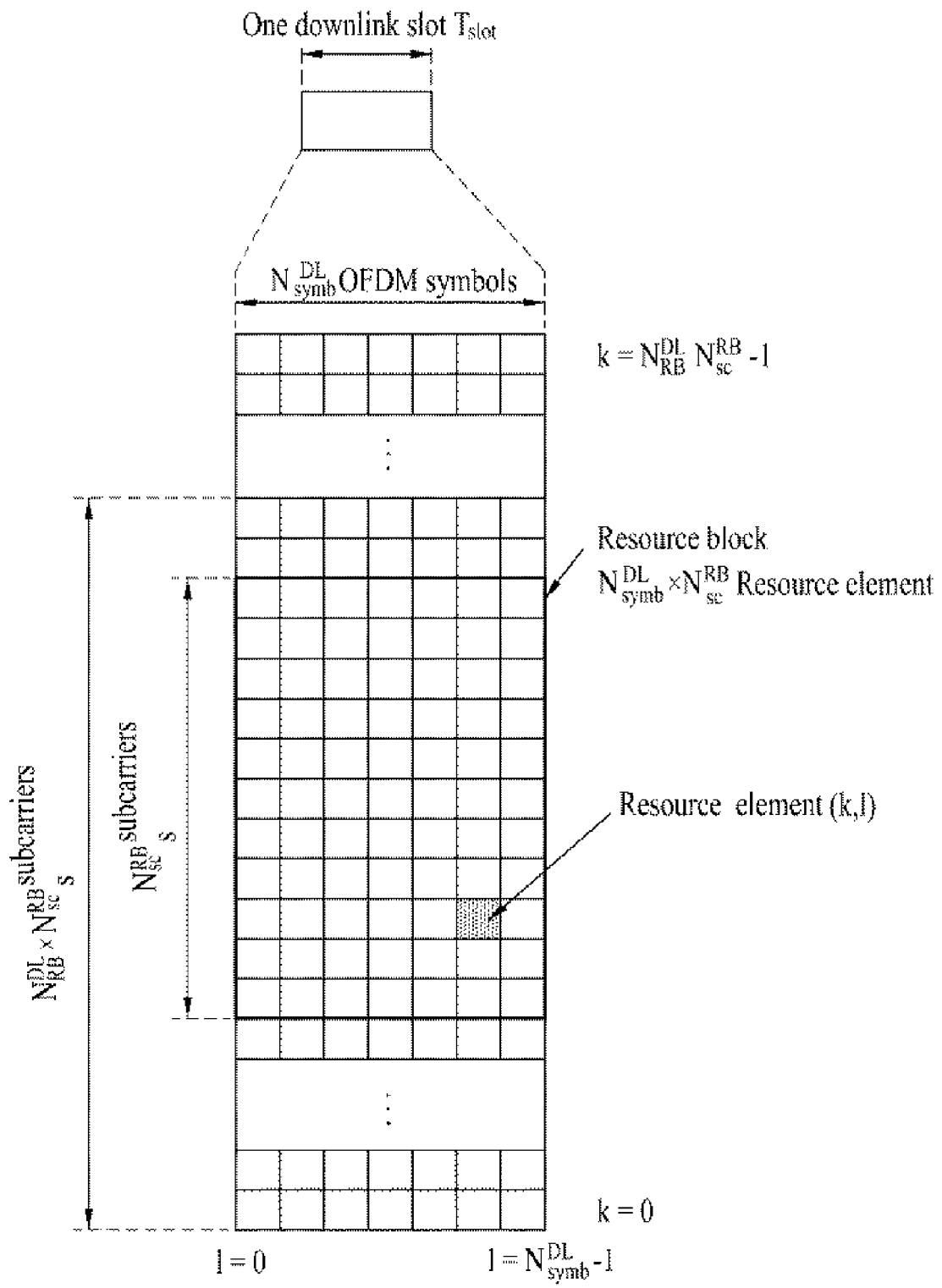
FIG. 4 is a diagram showing a downlink time-frequency resource grid structure used in the present invention.

FIG. 4 illustrates a downlink time-frequency resource grid structure according to the present invention.

Referring to the FIG. 4, the transmitted signal in each slot is described by a resource grid of $N_{RB}^{DL} \times N_{SC}^{RB}$ subcarriers and $N_{symb}^{DL}$ OFDM symbols. Here, $N_{RB}^{DL}$ represents for the number of resource blocks (RBs) for downlink, $N_{SC}^{RB}$ represents for the number of subcarriers constituting a RB, and $N_{symb}^{DL}$ represents for the number of OFDM symbols in a downlink slot. The quantity $N_{RB}^{DL}$ depends on the downlink transmission bandwidth configured in the cell and shall fulfill $N_{RB}^{min,DL} \leq N_{RB}^{DL} \leq N_{RB}^{min,DL}$ and $N_{RB}^{max,RB}$, though not limited to these values, are the smallest and largest downlink bandwidth, respectively. Here, $N_{RB}^{min,DL}$ is the minimum downlink bandwidth and $N_{RB}^{max,RB}$ the maximum downlink bandwidth supported by the wireless communication system. The number of OFDM symbols in a slot depends on the cyclic prefix (CP) length and subcarrier spacing. In case of multi-antenna transmission, there may be one resource grid defined per antenna port.

Each element in the resource grid for antenna port p is called a resource element and is uniquely identified by the index pair (k,l) in a slot where k=0, ..., $N_{RB}^{DL}N_{SC}^{RB}-1$ and l=0, ..., $N_{symb}^{DL}-1$ are the indices in the frequency and time domains, respectively.

Resource blocks shown in FIG. 4 are used to describe the mapping of certain physical channels to resource elements. RB is classified into physical resource block (PRB) and virtual resource block (VRB).

A physical resource block is defined as $N_{symb}^{DL}$ consecutive OFDM symbols in the time domain and $N_{SC}^{RB}$ consecutive subcarriers in the frequency domain, where $N_{symb}^{DL}$ and $N_{SC}^{RB}$ may be given by Table 3. A physical resource block thus consists of $N_{symb}^{DL} \times N_{SC}^{RB}$ resource elements, corresponding to one slot in the time domain and 180 kHz in the frequency domain, though not limited to these values.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

$N_{RB}^{DL-1}$ in the frequency domain. The relation between the physical resource block number in the frequency domain and resource elements (k,l) in a slot is given by $$n_{PRB} = \left\lfloor \frac{k}{N_{sc}^{RB}} \right\rfloor.$$

A VRB can have the same size as that of the PRB. There are two types of VRBs defined, the first one being a localized type and the second one being a distributed type. For each VRB type, a pair of VRBs have a single VRB index in common (may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL-1}$, and $N_{RB}^{DL}$ VRBs belonging to a second one of the two slots are likewise each assigned any one index of 0 to $N_{RB}^{DL-1}$.

Hereinafter, the general MIMO technology will be described. The MIMO technology is an abbreviation of the Multi-Input Multi-Output technology. The MIMO technology uses multiple transmission (Tx) antennas and multiple reception (Rx) antennas to improve the efficiency of Tx/Rx data, whereas a previously conventional technique has generally used a single transmission (Tx) antenna and a single reception (Rx) antenna. In other words, the MIMO technology allows a transmission end or reception end of a wireless communication system to use multiple antennas (hereinafter referred to as a multi-antenna), so that the capacity or performance can be improved. For the convenience of description, the term "MIMO" can also be considered to be a multi-antenna technology.

In more detail, the MIMO technology is not dependent on a single antenna path to receive a single total message, collects a plurality of data pieces received via several antennas, and completes total data. As a result, the MIMO technology can increase a data transfer rate within a specific range, or can increase a system range at a specific data transfer rate.

The next-generation mobile communication technology requires a higher data transfer rate than that of a conventional mobile communication technology, so that it is expected that the effective MIMO technology is requisite for the next-generation mobile communication technology. Under this assumption, the MIMO communication technology is the next-generation mobile communication technology to be applied to mobile communication terminals or repeaters, and can extend the range of a data communication range, so that it can overcome the limited amount of transfer data of other mobile communication systems due to a variety of limited situations.

In the meantime, the MIMO technology from among a variety of technologies capable of improving the transfer efficiency of data can greatly increase an amount of communication capacity and Tx/Rx performances without allocating additional frequencies or increasing an additional power. Due to these technical advantages, most companies or developers are intensively paying attention to this MIMO technology.

Figure 5:
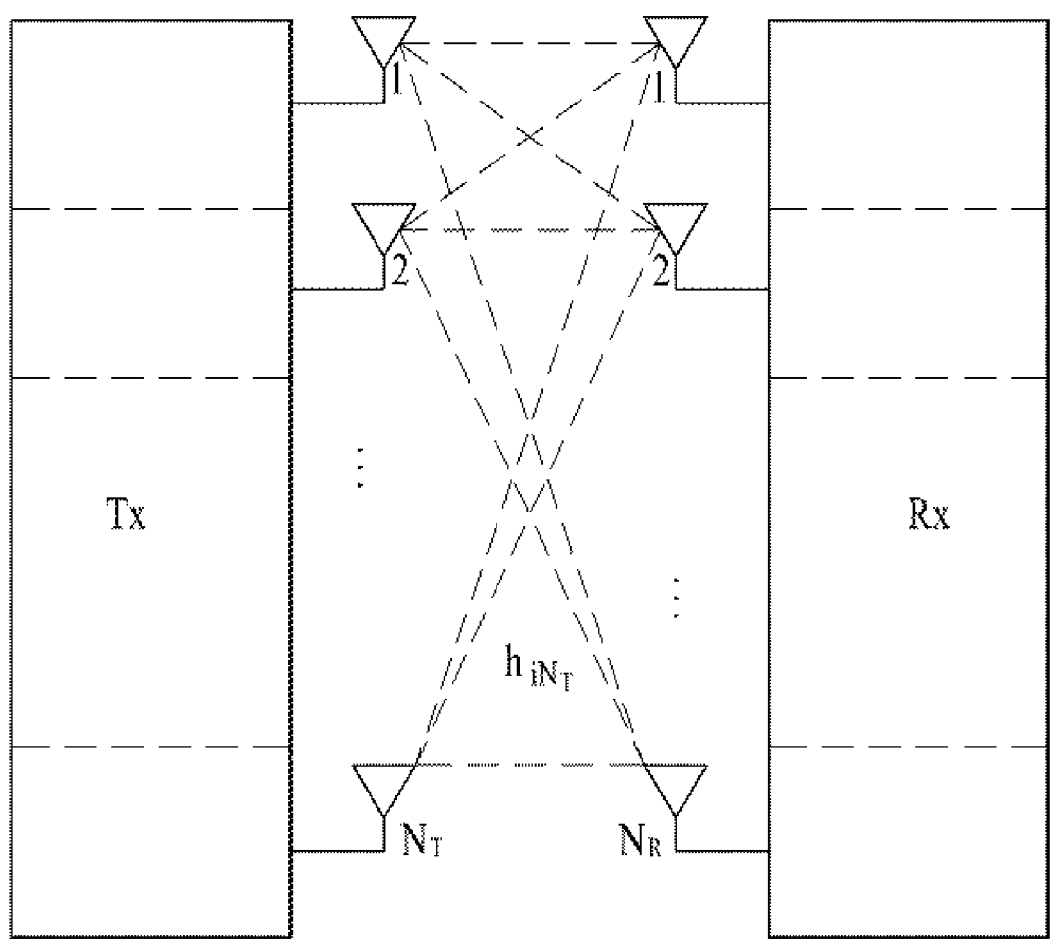
FIG. 5 is a diagram showing the configuration of a general Multiple Input Multiple Output (MIMO) communication system.

FIG. 5 illustrates an exemplary of general multiple antennas communication.

Referring to FIG. 5, if the number of transmission (Tx) antennas increases to NT, and at the same time the number of reception (Rx) antennas increases to NR, a theoretical channel transmission capacity of the MIMO communication system increases in proportion to the number of antennas, differently from the above-mentioned case in which only a transmitter or receiver uses several antennas, so that a transfer rate and a frequency efficiency can greatly increase.

In this case, the transfer rate acquired by the increasing channel transmission capacity is equal to the multiplication of a maximum transfer rate ($R_o$) acquired when a single antenna is used and a rate increment ($R_i$), and can theoretically increase. The rate increment ($R_i$) can be represented by the following equation 1:

$$R_i = \min(N_T, N_R) \quad \text{[Equation 1]}$$

A mathematical modeling of a communication method for use in the above-mentioned MIMO system will hereinafter be described in detail. Firstly, as can be seen from FIG. 5, it is assumed that $N_T$ Tx antennas and NR Rx antennas exist. In the case of a transmission (Tx) signal, a maximum number of transmission information pieces is $N_T$ under the condition that $N_T$ Tx antennas are used, so that the Tx signal can be represented by a specific vector shown in the following equation 2:

$$s = [s_1, s_2, \ldots, s_{N_T}]^T \quad \text{[Equation 2]}$$

In the meantime, individual transmission information pieces ($S_1, S_2, \ldots, S_{N_T}$) may have different transmission powers. In this case, if the individual transmission powers are denoted by ($P_1, P_2, \ldots, P_{N_T}$) transmission information having an adjusted transmission power can be represented by a specific vector shown in the following equation 3:

$$\hat{s} = [\hat{s}_1, \hat{s}_2, \ldots \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a diagonal matrix of a transmission power, and can be represented by the following equation 4:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector having an adjusted transmission power is multiplied by a weight matrix (W), so that $N_T$ transmission (Tx) signals (x1, x2, . . . , $X_{N_T}$) to be actually transmitted are configured. In this case, the weight matrix is adapted to properly distribute Tx information to individual antennas according to Tx-channel situations. The above-mentioned Tx signals ($x_1, x_2, \ldots, X_{N_T}$) can be represented by the following equation 5 using the vector (x):

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, wij is a weight between the i-th Tx antenna and the j-th Tx information, and W is a matrix indicating the weight wij. The matrix W is called a weight matrix or a precoding matrix. In the meantime, the above-mentioned Tx signal (x) can be considered in different ways according to two cases, i.e., a first case in which the spatial diversity is used and a second case in which the spatial multiplexing is used. In the case of using the spatial multiplexing, different signals are multiplexed and the multiplexed signals are transmitted to a destination, so that elements of the information vector (s) have different values.

Otherwise, in the case of using the spatial diversity, the same signal is repeatedly transmitted via several channel paths, so that elements of the information vector (s) have the same value. Needless to say, the combination of the spatial multiplexing scheme and the spatial diversity scheme may also be considered. In other words, the same signal is transmitted via three Tx antennas according to the spatial diversity scheme, and the remaining signals are spatially multiplexed and then transmitted to a destination. Next, if $N_R$ Rx antennas are used, Rx signals ($y_1, y_2, \ldots, y_{N_R}$) of individual antennas can be represented by a specific vector (y) shown in the following equation 6:

$$y = [y_1, y_2, \ldots, y_{N_R}]^T \quad \text{[Equation 6]}$$

In the meantime, if a channel modeling is executed in the MIMO communication system, individual channels can be distinguished from each other according to Tx/Rx antenna indexes. A specific channel passing the range from a Tx antenna (j) to an Rx antenna (i) is denoted by $h_{ij}$. In this case, it should be noted that the index order of the channel $h_{ij}$ is located before an Rx-antenna index and is located after a Tx-antenna index. Several channels are tied up, so that they are displayed in the form of a vector or matrix. An exemplary vector is as follows.

Figure 6:
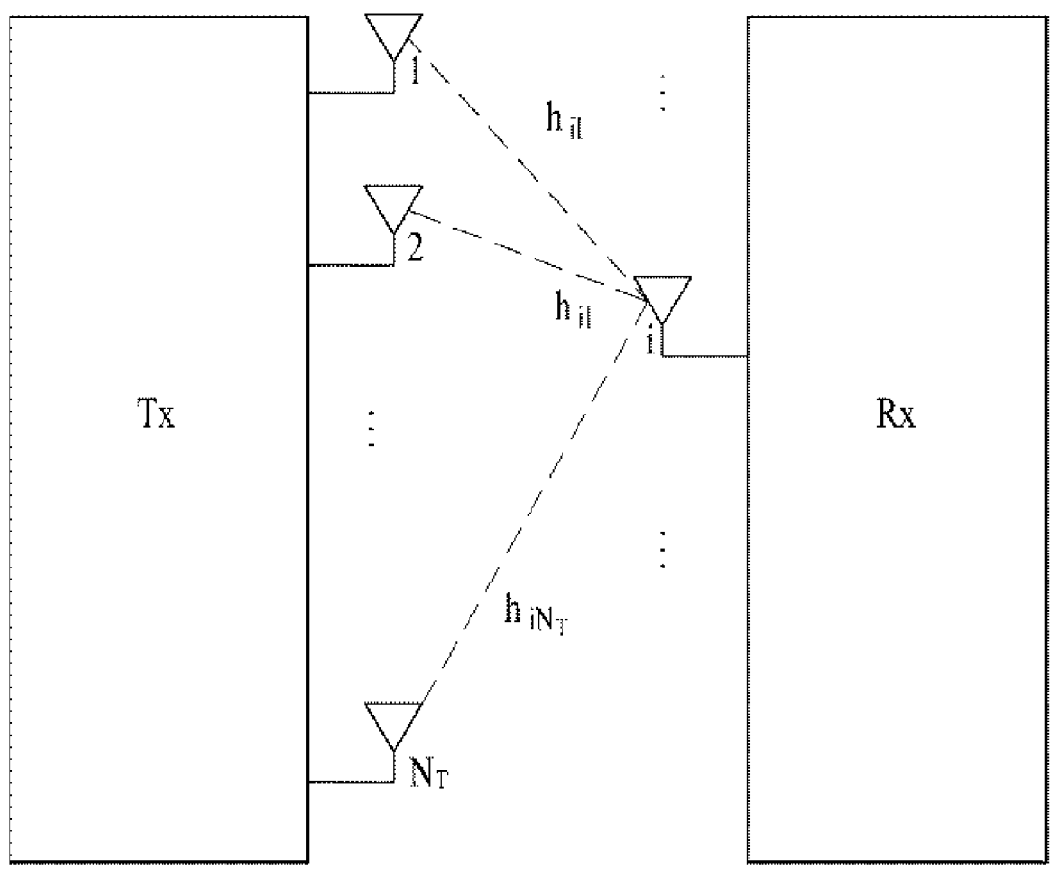
FIG. 6 is a diagram showing channels from $N_T$ transmission antennas to a reception antenna i.

FIG. 6 shows channels from $N_T$ Tx antennas to an Rx antenna (i). Referring to FIG. 6, the channels passing in the range from the $N_T$ Tx antennas to the Rx antenna (i) can be represented by the following equation 7:

$$h_i^T = [h_{i1}, h_{i2}, \ldots, h_{iN_T}] \quad \text{[Equation 7]}$$

If all channels passing in the range from the NT Tx antennas to $N_R$ Rx antennas are denoted by the matrix shown in Equation 7, the following equation 8 is acquired:

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

In the meantime, an Additive White Gaussian Noise (AWGN) is added to an actual channel which has passed the channel matrix H shown in Equation 8. The AWGN (n1, n2, ..., $n_{N_R}$) added to each of $N_R$ Rx antennas can be represented by a specific vector shown in the following equation 9:

$$n = [n_1, n_2, \ldots, n_{N_R}]^T \quad \text{[Equation 9]}$$

By the above-mentioned modeling method of the Tx signal, Rx signal, and AWGN, each MIMO communication system can be represented by the following equation 10:

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

In the meantime, the number of rows and the number of columns of a channel matrix H indicating a channel condition is determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by $N_R$ $N_T$ matrix.

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11:

$$\text{rank}(H) \leq \min(N_T, N_R) \quad \text{[Equation 11]}$$

A downlink reference signal will hereinafter be described in detail.

The downlink reference signal includes a common reference signal (CRS) shared among all UEs contained in a cell and a dedicated reference signal (DRS) assigned to a specific UE. In the 3GPP LTE-A system or the like, the DRS may also be referred to as a demodulation RS (DM RS).

The common reference signal (CRS) may be used to acquire channel status information and perform handover measurement. The dedicated reference signal (DRS) may be used to demodulate data. The CRS may be a cell-specific reference signal, and the DRS may be a UE-specific reference signal.

The UE measures the CRS and informs the BS of channel feedback information (e.g., Channel Quality Information (CQI), Precoding Matrix Indicator (PMI), and Rank Indicator (RI)). The BS performs downlink frequency scheduling using feedback information received from the UE.

In order to transmit the aforementioned reference signals to the UE, the BS performs resource allocation in consideration of the amount of radio resources to be allocated to each reference signal, exclusive position of the CRS and the DRS, position of a synchronous channel (SCH) and a broadcast channel (BCH), the DRS density, and the like.

In this case, provided that a relatively large amount of resources is assigned to each reference signal, a data transmission rate is relatively deteriorated whereas channel estimation performance is increased. Provided that a relatively small amount of resources is assigned to each reference signal, a reference signal density is lowered whereas a data transmission rate is increased, resulting in deterioration of channel estimation performance. Effective resource allocation of each reference signal in consideration of channel estimation, data transmission rate, etc. is of importance to system performance.

Figure 7:
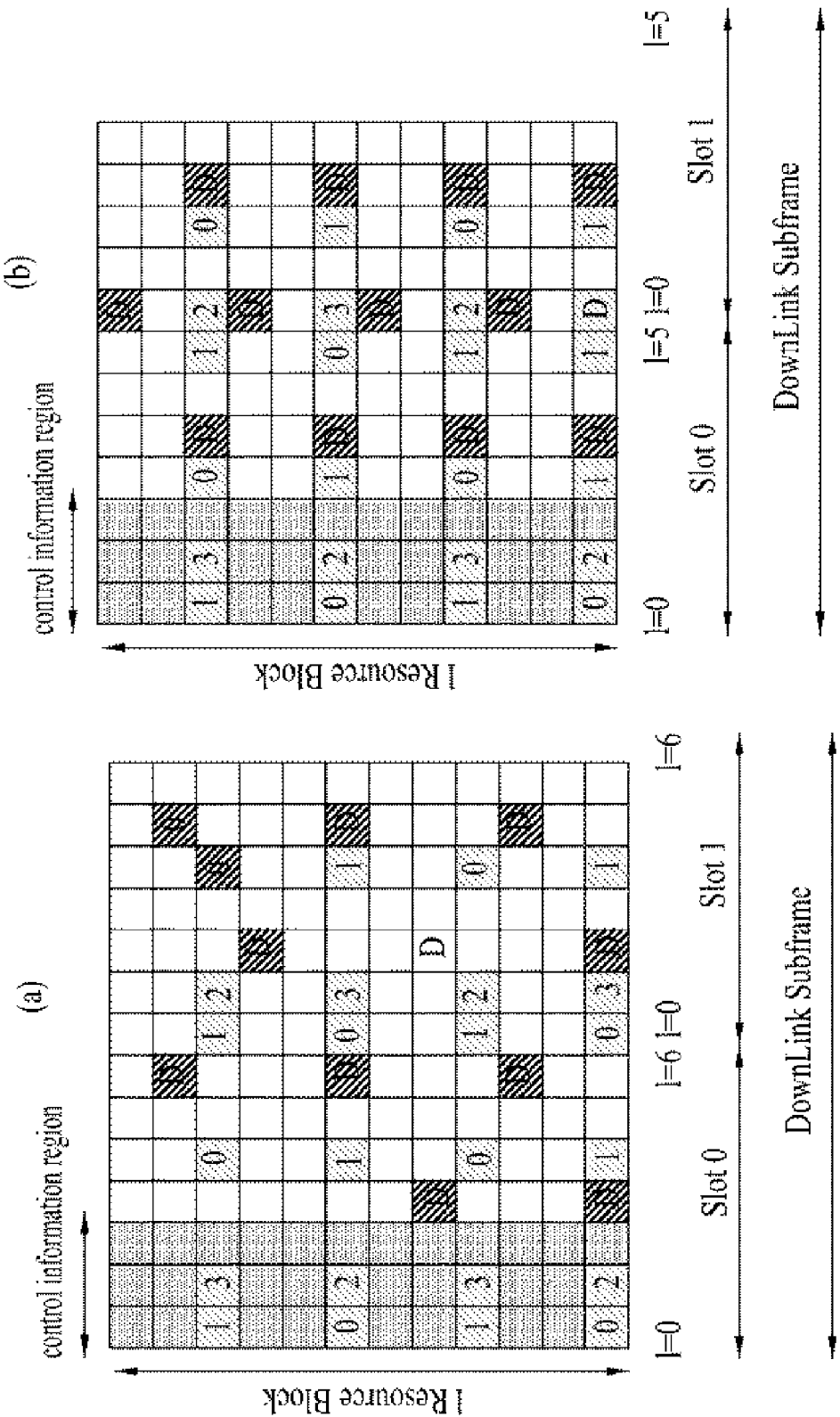
FIG. 7 is a diagram showing a reference signal pattern in a 3GPP LTE system which is an example of a mobile communication system.
Figure 8:
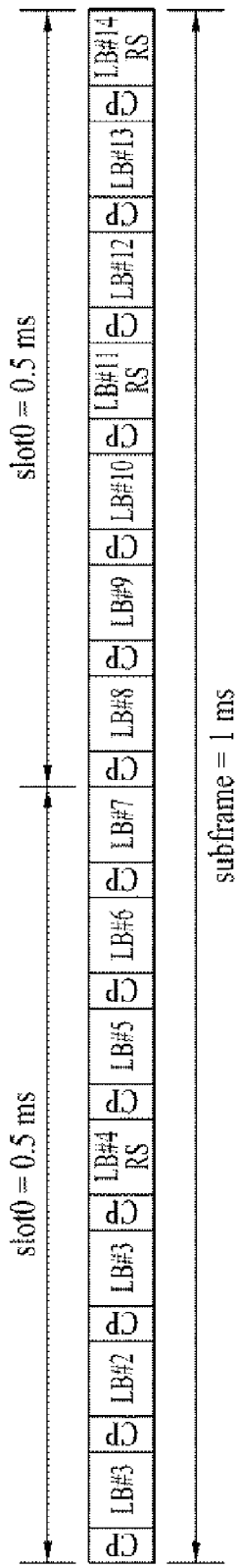
FIG. 8 is a diagram showing an example of the configuration of an uplink subframe including SRS symbols.

FIG. 7 is a conceptual diagram illustrating a reference signal (RS) structure for use in a downlink (DL) subframe according to one embodiment of the present invention, and shows a subframe structure mapped to a reference signal in a system capable of supporting a maximum of 4 antennas.

Referring to FIG. 7, one downlink subframe is composed of two time slots in a time domain, reference number '1' represents a symbol index of each slot, and the initial three symbols are assigned to a control information region. In addition, a reference signal (RS) is mapped in units of one resource block in a frequency domain, and the mapped resultant RS is repeatedly transmitted.

In FIG. 7, the number of OFDM symbols contained in one slot may be changed according to a cyclic prefix (CP) construction. FIG. 7(a) shows OFDM symbols for use with a normal CP. In FIG. 7(a), the number of OFDM symbols contained in one slot is 7. FIG. 7(b) shows OFDM symbols for use in the extended CP. In FIG. 7(b), the length of one OFDM symbol is increased, such that the number of OFDM symbols contained in one slot is less than that of a normal CP, for example, the number of OFDM symbols may be set to 6.

Reference elements (REs) 0, 1, 2 and 3 (where, 0, 1, 2, 3 and 4 represent R0, R1, R2 and R3 corresponding to RS per antenna port respectively) from among resource elements (REs) contained in the resource block (RB) shown in FIG. 7(a) or 7(b) represent cell-specific common reference signal (CRS) for four antenna ports. The REs 0, 1, 2 and 3 are adapted to measure a status of a channel transmitted through each antenna port 0, 1, 2 or 3 as well as to demodulate data transmitted to each port 0, 1, 2 or 3. Reference symbol 'D' represents a UE-specific dedicated reference signal (DRS), and is adapted to demodulate data transmitted over PDSCH. Information about the presence or absence of the DRS is transmitted to the UE via higher-layer signaling. This information corresponds to an effective resource element (RE) only in the case of a UE to which the corresponding PDSCH is allocated.

If the common reference signal (CRS) is mapped to time-frequency region resources, mapping of the CRS for one antenna port is performed at intervals of 6 REs in a frequency domain, and the CRS mapping result is transmitted at intervals of 6 REs. Therefore, one RB is composed of a total of 12 REs in a frequency domain, and two REs are used per antenna port.

On the other hand, RS mapping rules into resource block are following as Equation 12

CRS [Equation 12]

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

DRS (normal CP)

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

DRS (extended CP)

$$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

Here, k and p mean subcarrier index and antenna port. And $N_{RB}^{DL}$, $n_s$, $N_{cell}^{ID}$ mean number of RB allocated for DL, slot index, cell ID. Note that given RS positioning depends on $V_{shift}$ values in terms of frequency domain.

It is expected that the LTE-A system which is the standard of the next generation mobile communication system will support a coordinated multi point (CoMP) system, which is not supported in the existing standard, to improve a data transmission rate. In this case, the CoMP system means that a system in which two or more base stations or cells perform communication with a user equipment in cooperation with each other to improve communication throughput between a user equipment located in a shade zone and a base station (cell or sector).

The CoMP system can be classified into a CoMP-joint processing (CoMP-JP) system of cooperative MIMO type through data sharing and a CoMP-coordinated scheduling/beamforming (CoMP-CS/CB) system.

In case of the downlink, according to the CoMP-JP system, the user equipment can simultaneously receive data from each base station that performs CoMP, and can improve receiving throughput by combining signals received from each base station with one another. Unlike the CoMP-JP system, according to the CoMP-CS/CB system, the user equipment can receive data from one base station through beamforming.

In case of the uplink, according to the CoMP-JP system, each base station can simultaneously receive a PUSCH signal from the user equipment. Unlike the CoMP-JP system, according to the CoMP-CS/CB system, only one base station can receive a PUSCH. In this case, the CoMP-CS/CB system is determined by cooperative cells (or base stations).

Meanwhile, when the channel status between the base station and the user equipment is poor, a relay node (RN) is provided between the base station and the user equipment, whereby a radio channel having the more excellent channel status can be provided to the user equipment. Also, a relay node is provided in a cell edge zone having a poor channel status from the base station, whereby a data channel can be provided at higher speed, and a cell service zone can be extended. In this way, the technology of the relay node has been introduced to remove a radio wave shadow zone in a wireless communication system, and is widely used at present.

The technology of the relay node is being recently developed to more intelligent type than a function of a repeater that simply amplifies a signal and transmits the amplified signal. Moreover, the technology of the relay node reduces the extension cost for installation of base stations and the maintenance cost of a backhaul network in a next generation mobile communication system and at the same time is required to extend service coverage and improve a data processing rate. As the technology of the relay node is gradually developed, it is required that a new wireless communication system should support a relay node used in the related art wireless communication system.

In a 3rd generation partnership project long term evolution-advanced (3GPP LTE-A) system, as forwarding for link connection between the base station and the user equipment is introduced to the relay node, two types of links having different attributes are applied to each of uplink and downlink carrier frequency bands. A connection link portion established between links of the base station and the relay node will be defined as a backhaul link. Transmission of frequency division duplex (FDD) mode or time division duplex (TDD) mode based on downlink resources will be defined as a backhaul downlink, and transmission of frequency division duplex (FDD) mode or time division duplex (TDD) mode based on uplink resources will be defined as a backhaul uplink.

The Sounding reference signal (SRS), which are not associated with uplink data and/or control transmission, are primarily used for channel quality estimation to enable frequency-selective scheduling on the uplink. However, they can be used for other purposes such as to enhance power control or to support various start-up functions for UEs not recently scheduled. Some examples include initial Modulation and Coding Scheme (MCS) selection, initial power control for data transmissions, timing advance, and so-called frequency semi-selective scheduling in which the frequency resource is assigned selectively for the first slot of a subframe and hops pseudorandomly to a different frequency in the second slot. In addition, SRS can be used for downlink channel quality estimation under the assumption that the wireless channel is reciprocal between the uplink and downlink. This assumption is especially valid in a time division duplex (TDD) system where the uplink and downlink share the same frequency spectrum and are separated in time domain.

The subframes in which SRS are transmitted by any UE within the cell are indicated by cell-specific broadcast signalling. A 4-bit cell-specific 'srsSubframeConfiguration' parameter indicates 15 possible sets of subframes in which SRS may be transmitted within each radio frame. This configurability provides flexibility in adjusting the SRS overhead depending on the deployment scenario. A 16th configuration switches the SRS off completely in the cell, which may for example be appropriate for a cell serving primarily high-speed UEs. The SRS transmissions are always in the last SC-FDMA symbol in the configured subframes, as shown in FIG. 2-9. Thus the SRS and DM RS are located in different SC-FDMA symbols. PUSCH data transmission is not permitted on the SC-FDMA symbol designated for SRS, resulting in a worst-case sounding overhead (with an SRS symbol in every subframe) of ~7%.

Each SRS symbol is generated by basis sequences (random sequence or ZC-based sequence set) where for a given time instance and bandwidth all the UEs in a cell use a same basis sequence while SRS transmissions from multiple UEs in a same time and band in a cell are distinguished orthogonally by different cyclic shifts of the basis sequence assigned to different UEs UE. SRS sequences from different cells can be distinguished by assigning different basis sequences in different cells where orthogonality is not guaranteed between different basis sequences.

Meanwhile, when the channel status between the base station and the user equipment is poor, a relay node (RN) is provided between the base station and the user equipment, whereby a radio channel having the more excellent channel status can be provided to the user equipment. Also, a relay node is provided in a cell edge zone having a poor channel status from the base station, whereby a data channel can be provided at higher speed, and a cell service zone can be extended. In this way, the technology of the relay node has been introduced to remove a radio wave shadow zone in a wireless communication system, and is widely used at present.

The technology of the relay node is being recently developed to more intelligent type than a function of a repeater that simply amplifies a signal and transmits the amplified signal. Moreover, the technology of the relay node reduces the extension cost for installation of base stations and the maintenance cost of a backhaul network in a next generation mobile communication system and at the same time is required to extend service coverage and improve a data processing rate. As the technology of the relay node is gradually developed, it is required that a new wireless communication system should support a relay node used in the related art wireless communication system.

In a 3rd generation partnership project long term evolution-advanced (3GPP LTE-A) system, as forwarding for link connection between the base station and the user equipment is introduced to the relay node, two types of links having different attributes are applied to each of uplink and downlink carrier frequency bands. A connection link portion established between links of the base station and the relay node will be defined as a backhaul link. Transmission of frequency division duplex (FDD) mode or time division duplex (TDD) mode based on downlink resources will be defined as a backhaul downlink, and transmission of frequency division duplex (FDD) mode or time division duplex (TDD) mode based on uplink resources will be defined as a backhaul uplink.

The relay node (RN) can receive information from the base station through the relay backhaul downlink, and can transmit information to the base station through the relay backhaul uplink. Also, the relay node can transmit information to the user equipment through the relay access downlink, and can receive information from the user equipment through the relay access uplink.

Meanwhile, in respect of band (or spectrum) of the relay node, if the backhaul link is operated in the same frequency band as that of the access link, the operation will be referred to as 'in-band' operation. If the backhaul link is operated in the frequency band different from that of the access link, the operation will be referred to as 'out-band' operation. In both in-band and out-band, a user equipment (hereinafter, referred to as 'legacy user equipment') operated in accordance with the existing LTE system (for example, release-8) should access a donor cell.

The relay node can be classified into a transparent relay node and a non-transparent relay node depending on whether the user equipment recognizes the relay node. The transparent relay node means that it fails to recognize whether the user equipment performs communication with the network through the relay node. The non-transparent relay node means that it recognizes whether the user equipment performs communication with the network through the relay node.

In respect of control, the relay node can be classified into a relay node configured as a part of a donor cell and a relay node that controls a cell by itself.

Although the relay node configured as a part of a donor cell has relay node ID, it does not have its own cell identity. If at least a part of radio resource management (RRM) is controlled by a base station to which a donor cell belongs (even though the other parts of the RRM are located in the relay node), it will be referred to as a relay node configured as a part of the donor cell. Preferably, this relay node can support the legacy user equipment. For example, examples of this type relay node include smart repeaters, decode-and-forward relays, L2 (second layer) relay nodes, and type-2 relay node.

The relay node that controls a cell by itself controls one cell or several cells, and a unique physical layer cell identity is provided to each of cells controlled by the relay node. Also, the same RRM mechanism can be used for each of the cells. In view of the user equipment, there is no difference between access to a cell controlled by the relay node and access to a cell controlled by the base station. Preferably, the cell controlled by the relay node can support the legacy user equipment. For example, examples of this type relay node include a self-backhauling relay node, L3 (third layer) relay node, a type-1 relay node and a type-1a relay node.

The type-1 relay node is an in-band relay node and controls a plurality of cells, each of which is regarded as a separate cell differentiated from the donor cell in view of the user equipment. Also, the plurality of cells respectively have their physical cell ID (define din LTE release-8), and the relay node can transmit its synchronization channel, reference signal, etc. In case of single-cell operation, the user equipment directly receives scheduling information and HARQ feedback from the relay node and transmit its control channel (scheduling request (SR), CQI, ACK/NACK, etc.) to the relay node. Also, in view of the legacy user equipments (operated in accordance with the LTE release-8 system), the type-1 relay node is regarded as a legacy base station (operated in accordance with the LTE release-8 system). Namely, the type-1 relay node has backward compatibility. Meanwhile, in view of the user equipments operated in accordance with the LTE-A system, the type-1 relay node is regarded as a base station different from the legacy base station, whereby throughput improvement can be provided.

The type-1a relay node has the same features as those of the aforementioned type-1 relay node in addition to out-band operation. The type-1a relay node can be configured in such a manner that its operation is less affected or not affected by the operation of L1 (first layer) operation.

The type-2 relay node is an in-band relay node, and does not have separate physical cell ID, whereby a new cell is not formed. The type-2 relay node is transparent with respect to the legacy user equipment, and the legacy user equipment fails to recognize the type-2 relay node. Although the type-2 relay node can transmit the PDSCH, it does not transmit CRS and PDCCH.

Meanwhile, in order that the relay node is operated in accordance with in-band, some resources in time-frequency domains should be prepared for the backhaul link, and can be established so as not to be used for the access link. This will be referred to as resource partitioning.

The general principle in resource partitioning of the relay node will be described as follows. The backhaul link and the access downlink can be multiplexed on one carrier frequency in accordance with the TDM mode (namely, only one of the backhaul downlink or the access downlink is enabled for a specific time). Similarly, the backhaul uplink and the access uplink can be multiplexed on one carrier frequency in accordance with the TDM mode (namely, only one of the backhaul uplink or the access uplink is enabled for a specific time).

According to backhaul link multiplexing in the FDD mode, backhaul downlink transmission is performed in a downlink frequency band and backhaul uplink transmission is performed in an uplink frequency band. According to backhaul link multiplexing in the TDD mode, backhaul downlink transmission is performed in a downlink subframe of the base station and the relay node and backhaul uplink transmission is performed in an uplink subframe of the base station and the relay node.

In case of the in-band relay node, if backhaul downlink reception from the base station and access downlink transmission to the user equipment are performed in a predetermined frequency band at the same time, a signal transmitted from a transmitter of the relay node can be received in a receiver of the relay node, whereby signal interference or RF jamming may occur in RF front-end of the relay node. Similarly, if access uplink reception from the user equipment and backhaul uplink transmission to the base station are performed in a predetermined frequency band at the same time, signal interference may occur in RF front-end of the relay node. Accordingly, it is difficult to perform simultaneous transmission and reception in one frequency band of the relay band unless sufficient separation (for example, a transmitting antenna and a receiving antenna are locally spaced apart from each other (for example, the transmitting antenna is installed on the ground and the receiving antenna is installed below the ground)) between the receiving signal and the transmitting signal is provided.

One solution for solving the problem of signal interference is that the relay node is operated so as not to transmit a signal to the user equipment when receiving a signal from a donor cell. In other words, a gap occurs in transmission from the relay node to the user equipment, and the user equipment (including legacy user equipment) can be configured so as not to expect any transmission from the relay node for the gap. The gap can be configured by a multicast broadcast single frequency network (MBSFN) subframe.

Hereinafter, the operation of the relay node having a plurality of antennas and supporting the MIMO scheme will be described. In particular, a method of appropriately distributing and managing the antennas of the relay node to a backhaul link Uu and an access link Un and a signaling method therefor will be described.

Figure 9:
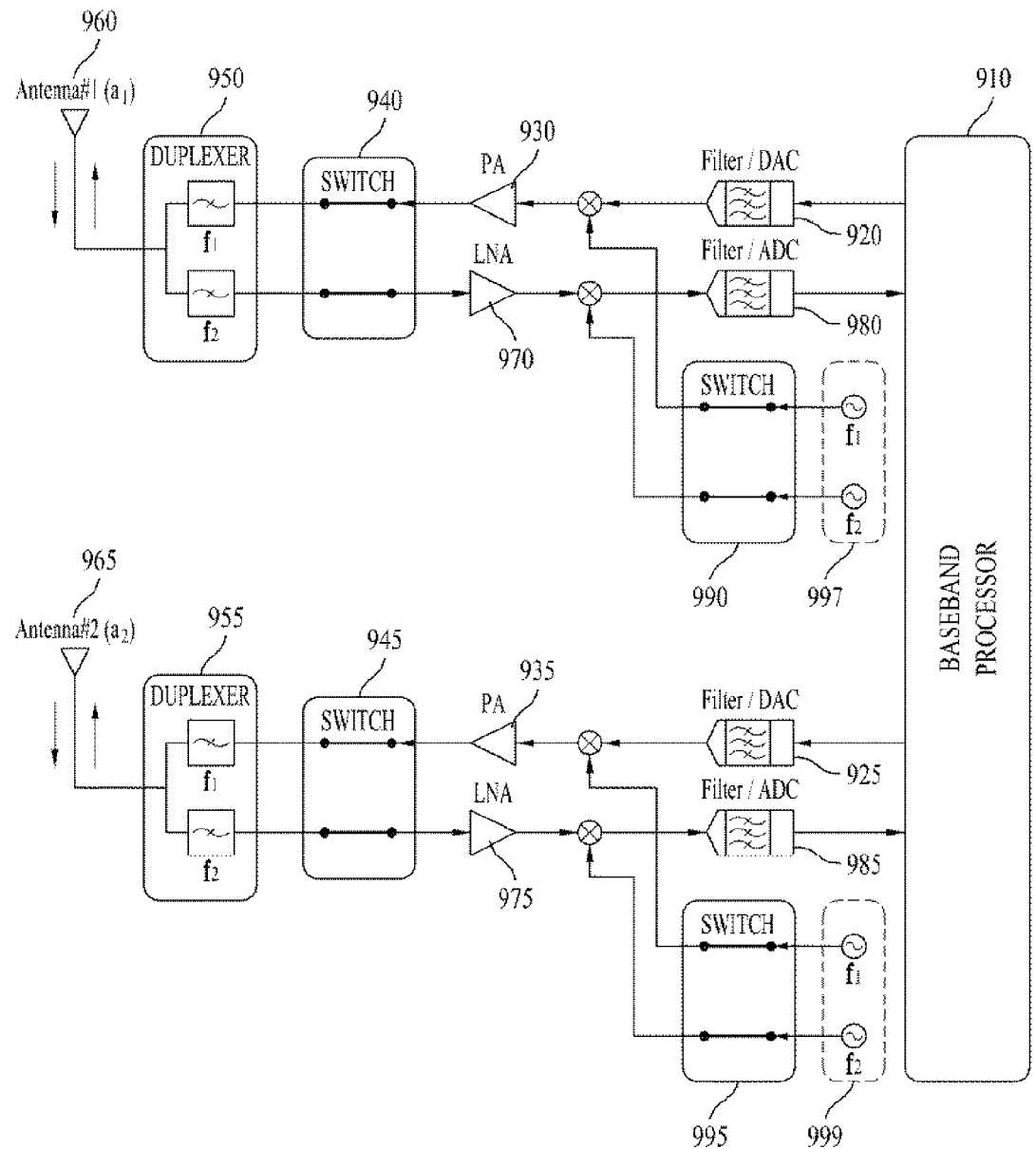
FIG. 9 is a diagram showing an example of the configuration of a relay node 900 according to the present invention.

FIG. 9 is a diagram showing an example of the configuration of a relay node 900 according to the present invention.

Referring to FIG. 9, the relay node (RN) 900 may include a baseband processor 910, filters/Digital-to-Analog Converters (DACs) 920 and 925, power amplifiers (PAs) 930 and 935, switches 940 and 945, duplexers 950 and 955, a first transmission/reception antenna 960, a second transmission/reception antenna 965, low noise amplifiers (LNAs) 970 and 975, filters/Analog-to-Digital Converters (ADCs) 980 and 985, switches 990 and 995 and Local Oscillators (LOs) 997 and 999. The filters/DACs 920 and 925, the power amplifiers 930 and 935, the switches 940 and 945, the duplexers 950 and 955, the first transmission/reception antenna 960, the second transmission/reception antenna 965, the low noise LNAs 970 and 975, the filters/ADCs 980 and 985, the switches 990 and 995 and the LOs 997 and 999 may be included in a Radio Frequency (RF) chain (or an RF module, etc.). The remaining configuration excluding the first transmission/reception antenna 910 and the second transmission/reception antenna 965 in the RF chain may correspond to the configuration of the transmitter 165 and the receiver 177 shown in FIG. 1.

A signal of a specific frequency band is used in wireless communication. The baseband processor 910 serves to modulate an original signal (baseband signal) to a signal of a high frequency band in a signal transmission process and demodulate a received high frequency signal to a baseband signal in a signal reception process. The baseband processor 910 may be an RF chip for modulating a baseband signal to a signal of a high frequency band or an "RF and baseband chip" which is a combination of a baseband chip for processing a baseband signal and an RF chip for modulating a baseband signal to a signal of a high frequency band or demodulating a received signal to a signal of a low frequency band and processing a baseband signal in a signal transmission and reception process.

As described above, the baseband processor 910 serves to modulate an original signal to a signal of a high frequency band in a signal transmission process and demodulate a signal of a high frequency band to a baseband signal in a signal reception process.

The filters/DACs 920 and 925 serve to convert the signals output from the baseband processor 910 into analog signals and the power amplifiers 930 and 935 serve to amplify the converted analog signals.

The switches 940 and 945 serve to input the signals received from the power amplifiers 930 and 935 to the duplexers 950 and 955 and transmit the signals received from the power amplifiers 930 and 935 to uplink frequency band ($f_2$) portions of the duplexers 950 and 955 in a cross way or to downlink frequency band ($f_1$) portions in a non-cross way. For convenience of description, hereinafter, it is assumed that the frequency band $f_1$ is a downlink band and the frequency band $f_2$ is an uplink band.

The antennas 960 and 965 may include the duplexers 950 and 955 (or RF duplexers) for separating two separate or adjacent frequency bands $f_1$ and $f_2$. As shown in FIG. 9, RF chains respectively corresponding to the antennas 960 and 965 may exist. The antennas 960 and 965 may receive signals from external devices or transmit signals to external devices.

The duplexers 950 and 955 may be connected to the cross-switchable switches 940 and 945 so as to output signals to the low noise amplifiers 970 and 975 or receive signals from the power amplifiers 930 and 935. The duplexers 950 and 955 may transmit downlink signals of the frequency band $f_1$ to the antennas 960 and 965 or the duplexers 950 and 955 may separate uplink signals of the frequency band $f_2$ of the signals received by the antennas 960 and 965 and output the separated uplink signals to the low noise amplifiers 970 and 975.

In general, power received by the RF receiver has a very low power level due to attenuation and noise. Thus, amplification is necessary. Since a transmitted signal includes much noise, an amplification function for minimizing noise is necessary. The low noise amplifiers 970 and 975 are designed by setting an operation point and a matching point such that a Noise Figure (NF) is low. The NF is generally in a range of 1.5 to 2.5. The low noise amplifiers 970 and 975 are basic RF amplifiers which use a small number of transistors and thermal noise elements such as resistors having a low NF and use less current in order to obtain low noise characteristics. The low noise amplifiers 970 and 975 can obtain maximum gain through conjugate matching.

The LOs 997 and 999 generate at least two clocks in order to provide the clocks to the system and generate, for example, signals of the frequency bands $f_1$ and $f_2$ as shown in FIG. 9. More specifically, the different clock signals output from the LOs 997 and 999 are frequently supplied to two circuits through two contact cross-switches 990 and 995. Such clocks are used to up-convert the signals input to the power amplifiers 930 and 935 and down-convert the signals output from the low noise amplifiers 970 and 975.

As shown in FIG. 9, the relay node 900 may include a total of four switches 940, 945, 990 and 995 in two antennas 960 and 965. The link operation mode of the relay node 900 is determined depending on how the four switches 940, 945, 990 and 995 are configured. As shown in FIG. 9, if all switches 940, 945, 990 and 995 are configured in a non-cross type, the relay node transmits and receives the signals to and from the UE through an access link using the two antennas 960 and 965. The link between the relay node and the UE is referred to as an access link and the access link is defined as a Uu link.

Although only the two antennas and the RF chains corresponding thereto are shown in FIG. 9 for convenience of description, the same design method is applicable to a plurality of antennas.

Figure 10:
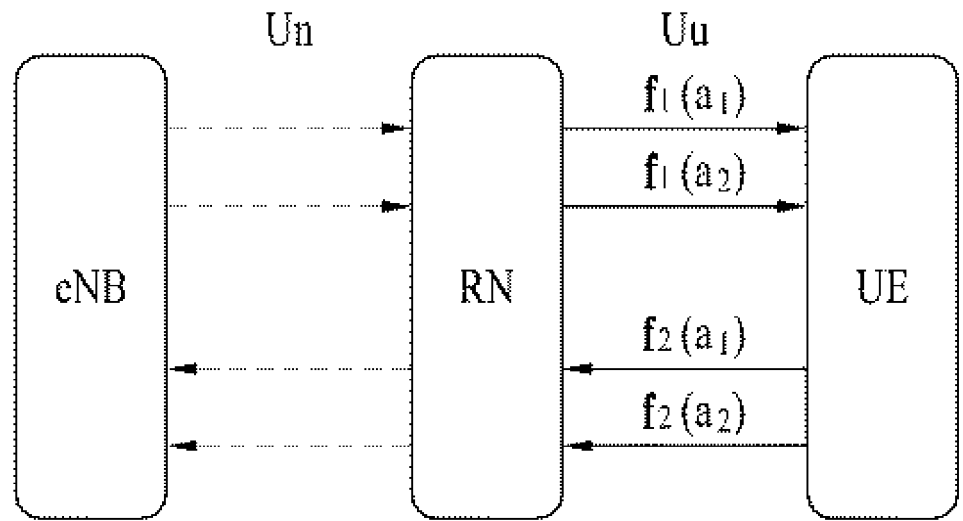
FIG. 10 is a diagram showing a signal transmission/reception mode of the relay node based on the configuration of the relay node shown in FIG. 9.

FIG. 10 is a diagram showing a signal transmission/reception mode of the relay node based on the configuration of the relay node shown in FIG. 9.

Referring to FIG. 10, a first transmission/reception antenna 960 shown in FIG. 9 is denoted by a1 and the second transmission/reception antenna 965 is denoted by a2. In FIG. 10, $f_1$(a1) indicates that the relay node transmits the signal of the frequency band $f_1$ to the UE using the first transmission/reception antenna 960 and $f_1$(a2) indicates that the relay node transmits the signal of the frequency band $f_1$ to the UE using the second transmission/reception antenna 965. In addition, $f_2$(a1) indicates that the relay node transmits the signal of the frequency band $f_2$ to the UE using the first transmission/reception antenna 960 and $f_2$(a2) indicates that the relay node transmits the signal of the frequency band $f_2$ to the UE using the second transmission/reception antenna 965.

As shown in FIG. 9, since all the switches 940, 945, 990 and 995 are configured in a non-cross type, the relay node 900 operates in a mode for transmitting and receiving the signal to and from the UE through the Uu link.

Figure 11:
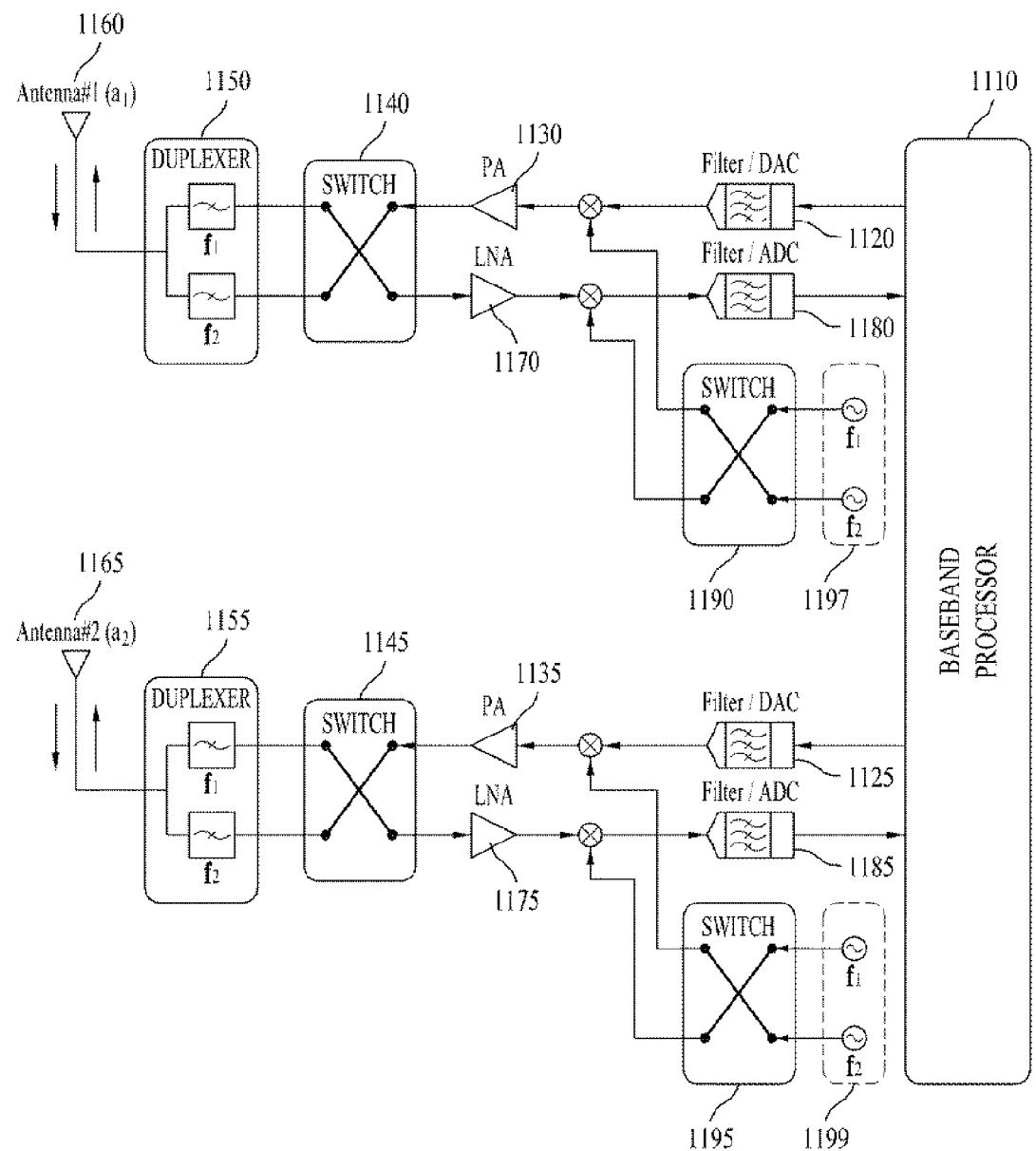
FIG. 11 is a diagram showing another example of the configuration of the relay node according to the present invention.

FIG. 11 is a diagram showing another example of the configuration of the relay node according to the present invention.

Referring to FIG. 11, the configuration of the relay node 1100 shown in FIG. 11 is substantially equal to that of the relay node 900 shown in FIG. 9, but is different from that of the relay node 900 in that the switches 1140, 1145, 1190 and 1195 of FIG. 11 are configured in a cross type and all the antennas and frequency resources are used for a backhaul link between the eNB and the relay node. Hereinafter, the backhaul link is defined as a Un link.

That is, the signals output from the power amplifiers 1130 and 1135 of the relay node 1100 are input to the frequency band ($f_2$) portion for separating the uplink frequency band signals of the duplexers 1150 and 1155 via the switches 1140 and 1145. The duplexers 1150 and 1155 transmit the uplink signals of the frequency band $f_2$ to the antennas 1160 and 1165 and the antennas 1160 and 1165 transmit the uplink signals to the eNB. The downlink signals of the frequency band $f_1$ received from the eNB through the antennas 1160 and 1165 are input to the low noise amplifiers 1170 and 1175. Accordingly, by the configurations of the switches 1140 and 1145 shown in FIG. 11, the relay node 1100 operates in a mode for transmitting and receiving the signal to and from only the eNB.

Figure 12:
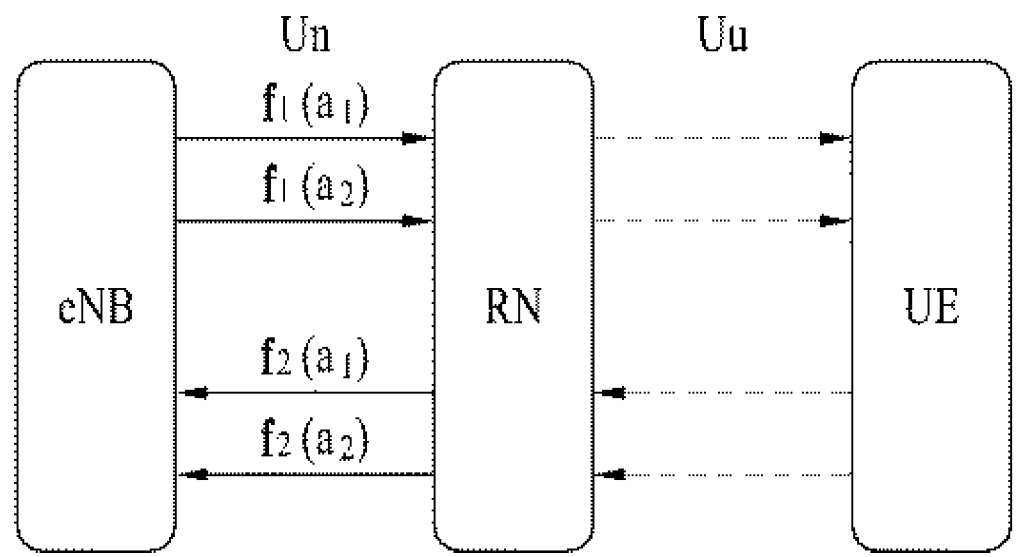
FIG. 12 is a diagram showing a signal transmission/reception mode of the relay node based on the configuration of the relay node 1100 shown in FIG. 11.

FIG. 12 is a diagram showing a signal transmission/reception mode of the relay node based on the configuration of the relay node 1100 shown in FIG. 11.

Referring to FIG. 12, a first transmission/reception (Tx/Rx) antenna 1160 shown in FIG. 11 is denoted by a1 and a second transmission/reception antenna 1165 is denoted by a2. In FIG. 12, $f_1$(a1) indicates that the eNB transmits the signal of the frequency band $f_1$ to the relay node using the first transmission/reception antenna 1160 and $f_1$(a2) indicates that the eNB transmits the signal of the frequency band $f_1$ to the relay node using the second transmission/reception antenna 1165. In addition, $f_2$(a1) indicates that the eNB transmits the signal of the frequency band $f_2$ to the relay node using the first transmission/reception antenna 1160 and $f_2$(a2) indicates that the eNB transmits the signal of the frequency band $f_2$ to the relay node using the second transmission/reception antenna 1165.

As shown in FIG. 11, since all the switches 1040, 1045, 1090 and 1095 are configured in a cross type, the relay node 1100 operates in a mode for transmitting and receiving the signal to and from only the eNB through the Un link.

Figure 13:
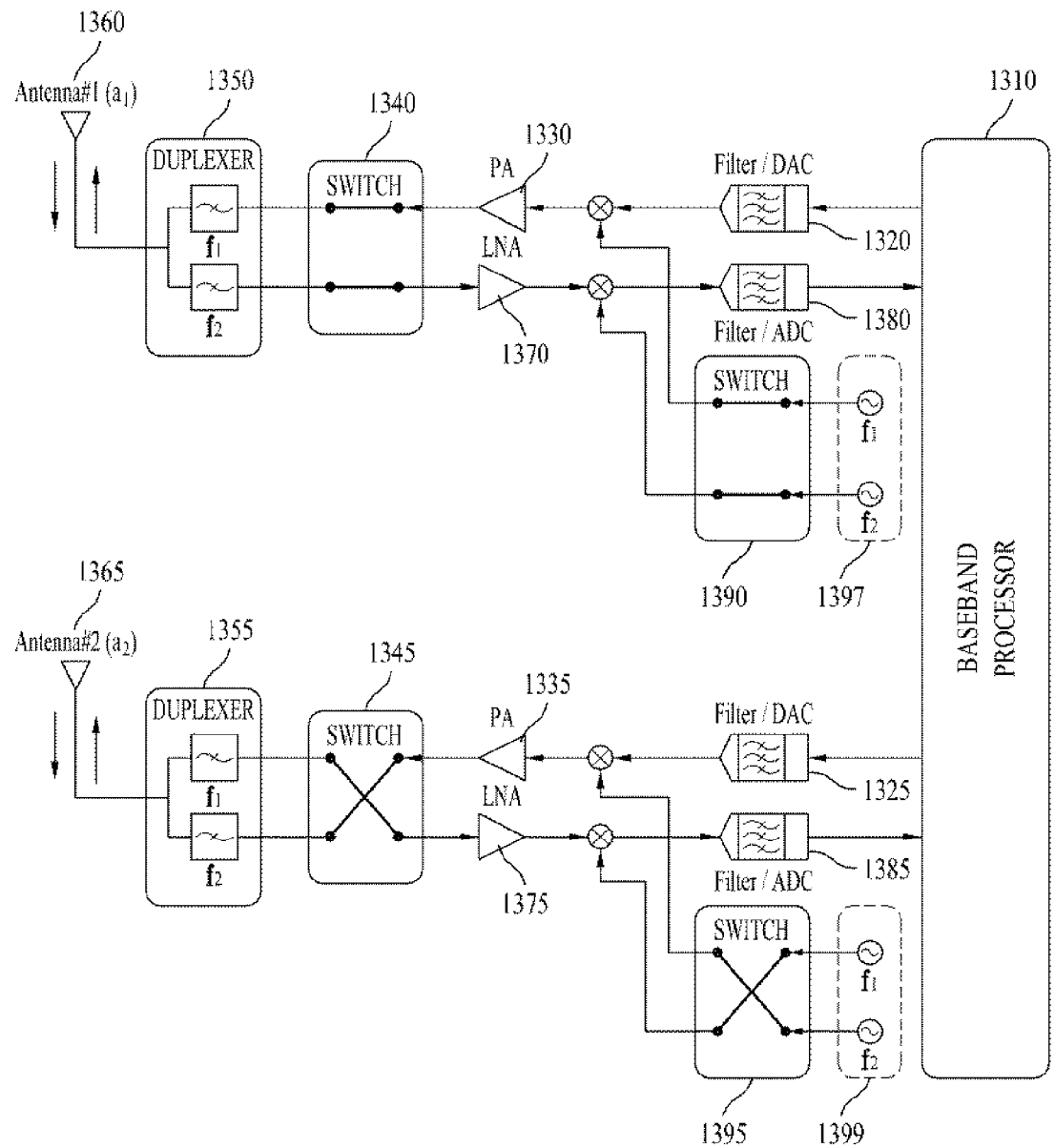
FIG. 13 is a diagram showing another example of the configuration of the relay node according to the present invention.

FIG. 13 is a diagram showing another example of the configuration of the relay node according to the present invention.

Referring to FIG. 13, the configuration of the relay node 1300 shown in FIG. 13 is substantially equal to that of the relay node 900 shown in FIG. 9, but is different from that of the relay node 900 in that the switches 1345 and 1395 are configured in a cross type in the RF chain of the second transmission/reception antenna 1365 of FIG. 13. Since only the switches of the second transmission/reception antennas 1365 are configured in the cross type, the second transmission/reception antenna 1365 is used for the Un link and the first transmission/reception antenna 1360 is used for the Uu link.

The relay node 1300 operates in the Uu link mode for transmitting and receiving the signal to and from the UE through the first transmission/reception antenna 1360 and operates in the Un link mode for transmitting and receiving the signal to and from the eNB through the second transmission/reception antenna 1365. That is, the relay node may operate in the Un link mode and the Uu link mode through the two antennas 1360 and 1365, respectively.

Figure 14:
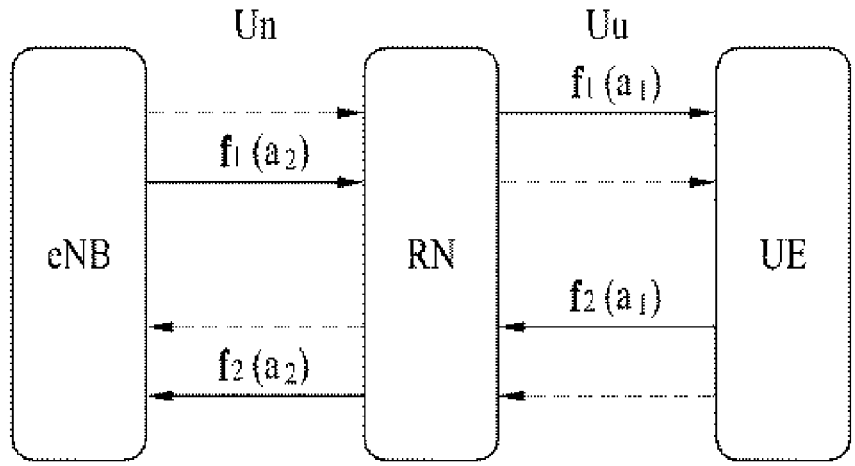
FIG. 14 is a diagram showing a signal transmission/reception mode of the relay node based on the configuration of the relay node 1300 shown in FIG. 13.
Figure 14:
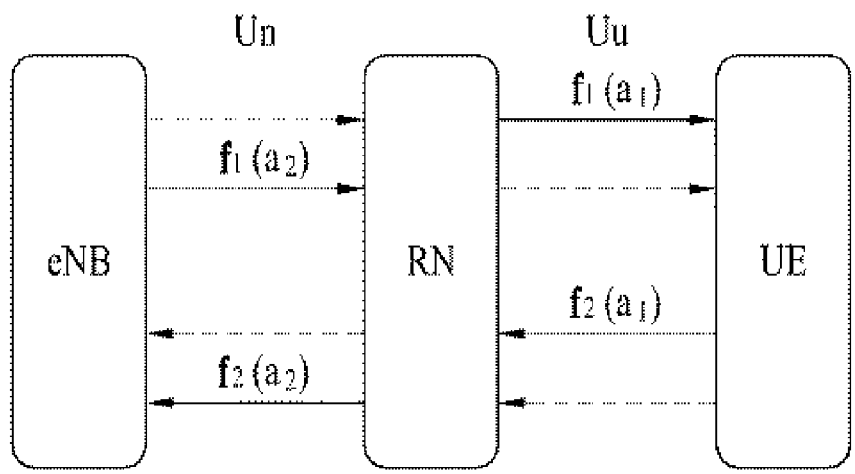

FIG. 14 is a diagram showing a signal transmission/reception mode of the relay node based on the configuration of the relay node 1300 shown in FIG. 13.

As described in association with FIG. 13, the relay node may transmit and receive the signals in different link operation modes through the antennas. FIG. 14(*a*) shows a link operation mode in the case where the relay node 1300 of FIG. 13 is a full duplex relay node. Referring to FIG. 14(*a*), the relay node may receive the downlink signal of the frequency band $f_1$ from the eNB through the second transmission/reception antenna 1365 and, at the same time, transmit the signal to the UE through the first transmission/reception antenna 1360. The relay node may receive the uplink signal of the frequency band $f_2$ from the UE through the first transmission/reception antenna 1360 and, at the same time, transmit the signal to the eNB through the second transmission/reception antenna 1365.

However, a half duplex relay node cannot operate in a bidirectional transmission/reception mode for transmitting the signal to the UE while receiving the signal from the eNB or transmitting the signal to the eNB while receiving the signal from the UE. Accordingly, the frequency band $f_1$ (carrier) cannot be simultaneously used for the Un link and the Uu link and the frequency band $f_2$ (carrier) cannot be simultaneously used for the Un link and the Uu link. Accordingly, the relay node may operate only in the transmission mode or the reception mode.

FIG. 14(*b*) shows a link operation mode in the case where the relay node 1300 of FIG. 13 is a half duplex relay node. As shown in FIG. 14(*b*), the relay node may operate only in the transmission mode. Although not shown in FIG. 14(*b*), the relay node may operate only in the reception mode.

Figure 15:
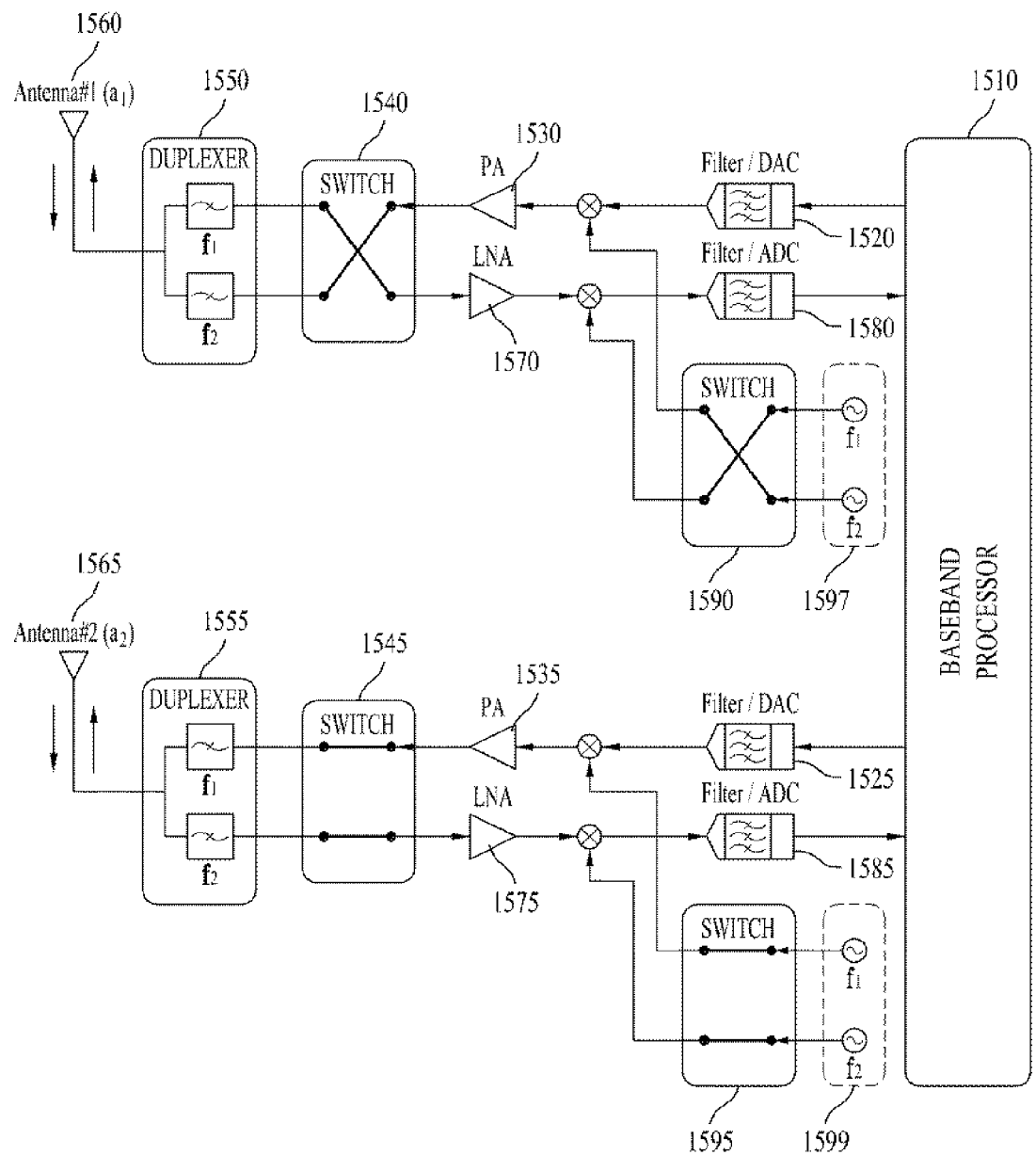
FIG. 15 is a diagram showing another example of the configuration of the relay node according to the present invention.

FIG. 15 is a diagram showing another example of the configuration of the relay node according to the present invention.

Referring to FIG. 15, the configuration of the relay node shown in FIG. 15 is different from that of the relay node 1300 shown in FIG. 13 in that the switches 1540 and 1590 are configured in a cross type in the RF chain of the first transmission/reception antenna 1560. Only the switches 1540 and 1590 of the RF chain of the first transmission/reception antenna 1560 are configured in a cross type such that only the first transmission/reception antenna 1560 is used for the Un link. In addition, the switches 1545 and 1595 of the RF chain of the second transmission/reception antenna 1565 are configured in a non-cross type such that the second transmission/reception antenna is used for the Uu link. Accordingly, the relay node 1500 operates in the Un link mode for transmitting and receiving the signal to and from the eNB in the first transmission/reception antenna 1560 and operates in the Uu link mode for transmitting and receiving the signal to and from the UE in the second transmission/reception antenna 1565.

Figure 16:
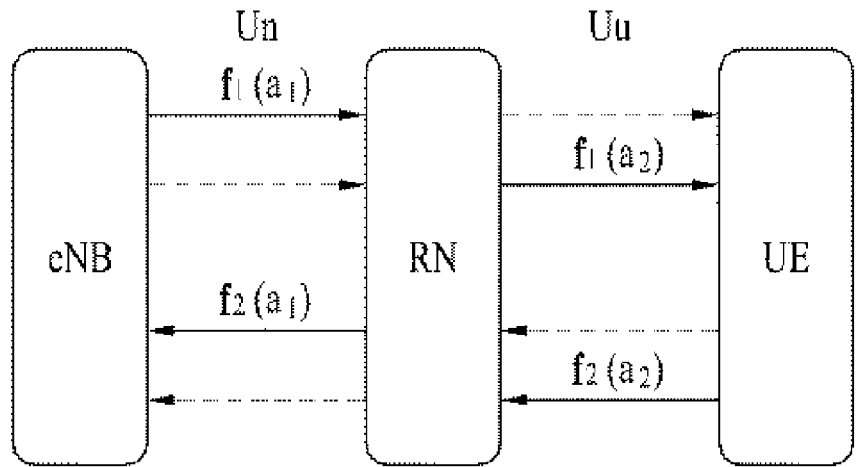
FIG. 16 is a diagram showing a signal transmission/reception mode of the relay node based on the configuration of the relay node 1500 shown in FIG. 15.
Figure 16:
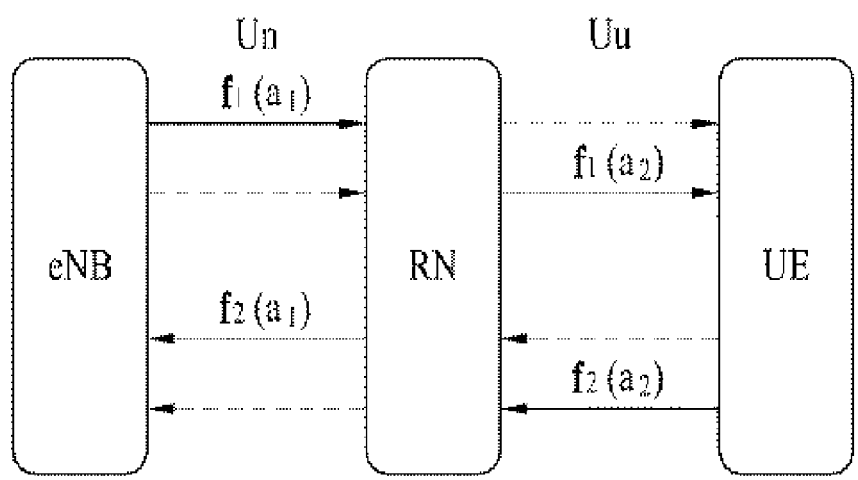

FIG. 16 is a diagram showing a signal transmission/reception mode of the relay node based on the configuration of the relay node 1500 shown in FIG. 15.

FIG. 16(*a*) shows a link operation mode in the case where the relay node 1500 of FIG. 15 is a full duplex relay node. Referring to FIG. 15(*a*), the relay node may receive the downlink signal of the frequency band $f_1$ from the eNB through the first transmission/reception antenna 1560 and, at the same time, transmit the signal to the UE through the second transmission/reception antenna 1565. The relay node may receive the uplink signal of the frequency band $f_2$ from the UE through the second transmission/reception antenna 1565 and, at the same time, transmit the signal to the eNB through the first transmission/reception antenna 1560.

FIG. 16(*b*) shows a link operation mode in the case where the relay node 1500 of FIG. 15 is a half duplex relay node. The half duplex relay node cannot operate in a bidirectional transmission/reception mode for transmitting the signal to the UE while receiving the signal from the eNB or transmitting the signal to the eNB while receiving the signal from the UE. Accordingly, the frequency band $f_1$ (carrier) cannot be simultaneously used for the Un link and the Uu link and the frequency band $f_2$ (carrier) cannot be simultaneously used for the Un link and the Uu link. Accordingly, the relay node may operate only in the transmission mode or the reception mode.

As shown in FIG. 16(*b*), the relay node may operate only in the reception mode. Although not shown in FIG. 16(*b*), the relay node may operate only in the transmission mode. As described above, although only the two antennas and the RF chains corresponding thereto are shown in the relay node for convenience of description, the same design method is applicable to a plurality of antennas. Hereinafter, the operation of a relay node having four antennas will be described. Although a maximum of eight antennas can be used in the MIMO scheme of the 3GPP LTE-A system, the relay node having four antennas will be described for convenience of description.

Figure 17:
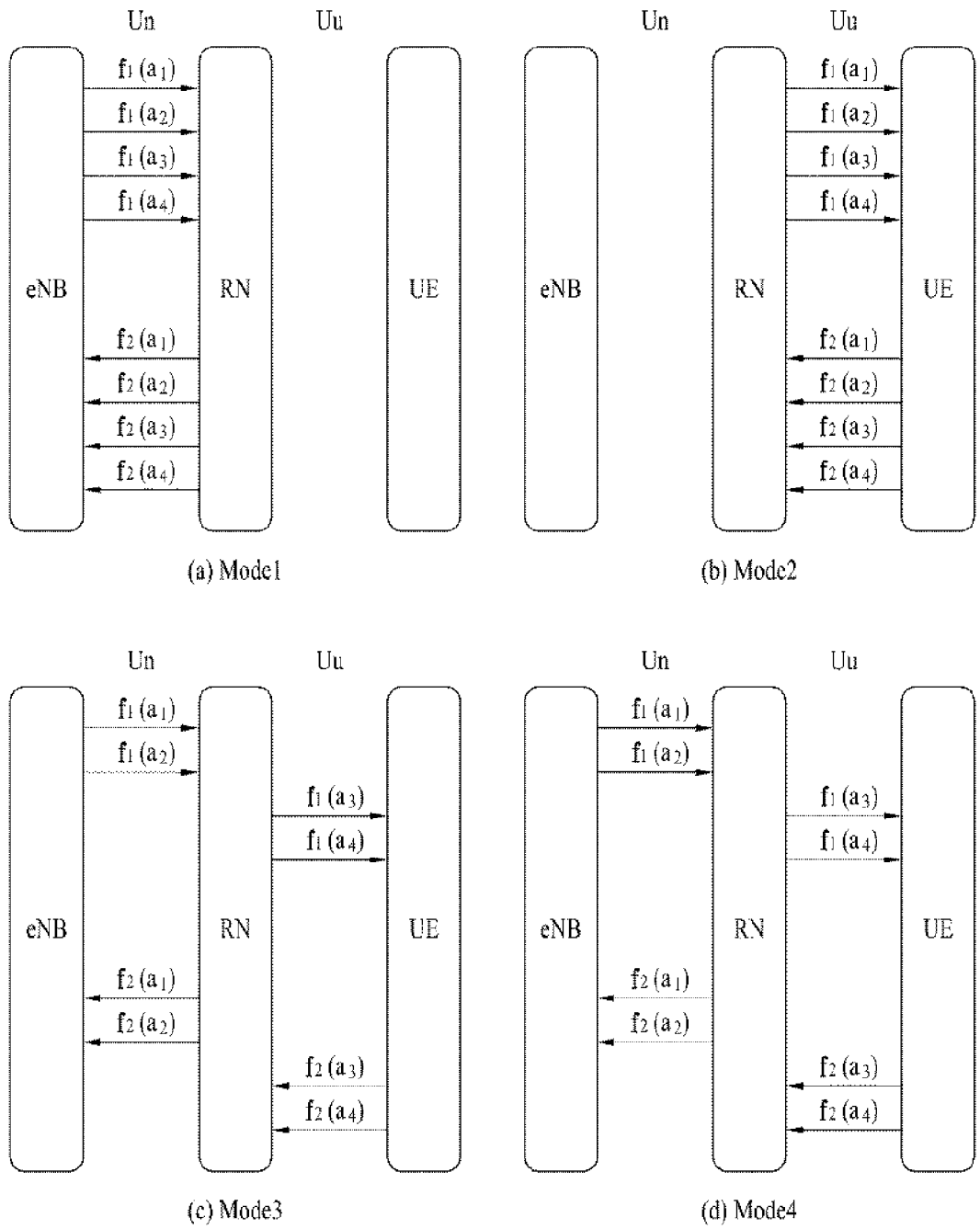
FIG. 17 is a diagram showing various link operation modes of the relay node.

FIG. 17 is a diagram showing various link operation modes of the relay node.

FIG. 17(*a*) shows the case where the relay node operates only in the Un link mode (that is, the mode for transmitting and receiving the signal to and from the eNB through the backhaul link Un, which is hereinafter referred to as a first mode). As shown in FIG. 17(*a*), the relay node may receive the downlink signal of the frequency band $f_1$ from the eNB through the four transmission/reception antennas a1, a2, a3 and a4 and transmit the uplink signal of the frequency band $f_2$ to the eNB through the four transmission/reception antennas a1, a2, a3 and a4. FIG. 17(*b*) shows the case where the relay node operates only in the Uu link mode (that is, the mode for transmitting and receiving the signal to and from the UE through the access link Uu, which is hereinafter referred to as a second mode). As shown in FIG. 17(*b*), the relay node may transmit the downlink signal of the frequency band $f_1$ to the UE through the four transmission/reception antennas a1, a2, a3 and a4 and receive the uplink signal of the frequency band $f_2$ from the UE through the four transmission/reception antennas a1, a2, a3 and a4.

FIG. 17(*c*) shows the case where the relay node operates only in the transmission mode (hereinafter referred to as a third mode). As shown in FIG. 17(*c*), the relay node may transmit the uplink signal of the frequency band $f_2$ to the eNB through two transmission/reception antennas a1 and a2 and transmit the downlink signal of the frequency band $f_1$ to the UE through the remaining two transmission/reception antennas a3 and a4. FIG. 17(*d*) shows the case where the relay node operates only in the reception mode (hereinafter referred to as a fourth mode). As shown in FIG. 17(*d*), the relay node may receive the downlink signal of the frequency band $f_1$ from the eNB through two transmission/reception antennas a1 and a2 and receive the uplink signal of the frequency band $f_2$ from the UE through the remaining two transmission/reception antennas a3 and a4. The relay node may operate while switching the transmission mode shown in FIG. 17C and the reception mode shown in FIG. 17(*d*).

In order to variably operate the relay node including a plurality of transmission/reception antennas according to the number of transmission/reception antennas, signaling may be necessary. Hereinafter, such signaling will be described.

First, signaling for Un uplink transmission of the relay node (uplink transmission to the eNB) will be described. In FIG. 17, when the relay node changes the link operation mode from the first mode to the third mode or vice versa (that is, when the relay node changes the number of antennas used to transmit the uplink signal through the Un link from 4 to 2 or vice versa), the eNB may transmit information about the change of the link operation mode to the relay node or the relay node may transmit the information about the change of the link operation mode to the eNB so that the eNB and relay node may share information about change of link operation mode (e.g, changed link operation mode in specific time unit). Accordingly, the relay node may select a Precoding Matrix Indicator (PMI) suitable for the changed link operation mode so as to perform uplink transmission. That is, a PMI may be selected and used from a predefined 4Tx codebook in the link operation mode using four antennas and a PMI may be selected and used from a predetermined 2Tx codebook in the link operation mode using two antennas. Optionally, the eNB may inform the relay node which antennas are used (alternatively, the relay node may inform the eNB which antennas are used).

In the uplink transmission of the relay node, if the eNB and/or the relay node cannot be aware of how many antennas are used, confusion may be caused and thus serious communication performance deterioration may be caused. For this reason, the number of antennas may be preferably signaled along with the information about the change of the link operation mode. More specifically, in order to easily change the link operation mode and reduce signaling overhead, the number of antennas to be used when the link operation mode is changed may be set in advance through higher layer signaling. For example, if the eNB sets the change in the number of antennas to be used from 4 (4Tx) to 2 (2Tx) or from 2 (2Tx) to 4 (4Tx) in advance, the number of antennas to be used when the link operation mode is changed need not be signaled to the relay node.

For example, the number of antennas available in the Un uplink transmission (that is, uplink transmission to the eNB) in a subframe in which the relay node does not perform Uu downlink transmission (that is, downlink transmission to the UE) in the first mode and the number of antennas available in the Un uplink transmission in a subframe in which the relay node performs Uu downlink transmission in the third mode may be differently set through higher layer signaling. The eNB may inform the relay node of the number of available antennas through higher layer signaling. In this case, the eNB and the relay node may become aware of the number of antennas used for Un uplink transmission of the relay node in each subframe. The relay node may become aware of a precoding matrix indicated by the PMI included in the UL grant of each subframe.

More specifically, if the eNB and the relay node may become aware of the subframe allocated to the Un link and the subframe allocated to the Uu link in downlink and uplink through signal exchange, the eNB and the relay node become aware of which link (Un link or Uu link) is activated in each subframe in downlink and uplink and thus become aware of the change in the number of antennas without additional signaling.

Next, signaling for Un downlink reception of the relay node will be described. In FIG. 17, when the relay node changes the link operation mode from the first mode (FIG. 17(a)) to the fourth mode (FIG. 17(d)) or vice versa (that is, when the relay node changes the number of antennas used to transmit the downlink signal through the Un link from 4 to 2 or from 2 to 4), the eNB may transmit information about the change of the link operation mode to the relay node or the relay node may transmit the information about the change of the link operation mode to the eNB such that a PMI suitable for each mode is selected so as to perform downlink transmission. In this case, the number of antennas may be preferably signaled along with the information about the change of the link operation mode.

More specifically, in order to easily change the link operation mode and reduce signaling overhead, the number of antennas to be used when the link operation mode is changed may be set in advance through higher layer signaling. For example, if the eNB sets the change in the number of used antennas from 4 (4Tx) to 2 (2Tx) or from 2 (2Tx) to 4 (4Tx) in advance, the number of antennas to be used when the link operation mode is changed may not be signaled to the relay node.

For example, the number of antennas available in the Un downlink reception (that is, downlink reception from the eNB) in a subframe in which the relay node does not perform the Uu uplink reception (that is, uplink reception from the UE) in the first mode and the number of antennas available in the Un downlink transmission in a subframe in which the relay node performs Uu uplink reception in the fourth mode may be differently set through higher layer signaling. The eNB may inform the relay node of the number of available antennas through higher layer signaling. In this case, the eNB and the relay node may aware of the number of antennas used for Un downlink transmission of the relay node in each subframe. The relay node may become aware of a maximum number of transport streams (that is, rank of the Un link) settable in each subframe.

More specifically, if the eNB and the relay node may be aware of the subframe allocated to the Un link and the subframe allocated to the Uu link in downlink and uplink through signal exchange, the eNB and the relay node may aware of which link is activated in each subframe in downlink and uplink and thus become aware of the change in the number of antennas without additional signaling. The relay node may apply a point, in which the number of reception antennas used for Un link is changed, to Channel Status Information (CSI) (e.g., PMI/CQI/RI) measurement and report. For example, the relay node may divide the Un link subframe into two groups depending on whether or not a signal is received in Uu uplink, differently perform channel status estimation according to the groups, and feed back the respective measurement results of the groups to the eNB.

Next, signaling necessary for the Uu uplink reception of the relay node will be described. If the link operation mode of the relay node is changed from the second mode to the third mode, the UE needs to perform measurement and measurement report in consideration that the number of transmission antennas of the relay node is decreased from 4 to 2. That is, it is necessary to enable the UE to perform feedback report. Accordingly, the UE performs Reference Signal (RS) measurement of 4 Tx antennas and feedback information (CQI, PMI, Rank Indicator (RI)) transmission in a specific subframe and performs measurement of 2 Tx antennas and feedback information transmission in another subframe. The UE receives feedback information for measurement and measurement report and operates according thereto. More specifically, the relay node may implicitly become aware of in which mode the relay node operates in a specific subframe based on information about a subframe allocation pattern allocated to the Un link and scheduling of access subframe of the relay node. Alternatively, the relay node may explicitly receive information regarding in which mode the relay node operates.

Hereinafter, signaling necessary for each link operation mode of the relay node will be summarized. First, Codebook Table Indication (CTI) signaling may be necessary for Un/Uu uplink. Since the number of antennas used by the relay node is changed, signaling for deciding a codebook table may be necessary. At this time, the number of antennas used by the relay node may be predefined to a predetermined number. For example, the change in the number of antennas may be defined such that a mode in which antenna indexes 0, 1 and 2 (that is, three antennas) are used is changed to a mode in which antenna indexes 0, 1, 2 and 3 (that is, four antennas) are used, or vice versa. Alternatively, the change in the number of antennas may be defined such that a mode in which antenna indexes 0 and 1 (that is, two antennas) are used is changed to a mode in which antenna indexes 0, 1, 2 and 3 (that is, four antennas) are used, or vice versa. Alternatively, the change in the number of antennas may be defined such that a mode in which antenna index 0 (that is, one antenna) is used is changed to a mode in which antenna indexes 0, 1, 2 and 3 (that is, four antennas) are used, or vice versa.

Next, for Un/Uu downlink, Feedback Mode Indication (FMI) signaling may be necessary. Since the number of antennas used by the relay node is changed, signaling for feedback may be necessary. At this time, the number of antennas used by the relay node may be predefined in a static manner or a semi-static manner. In a static manner or a semi-static manner, the change in the number of antennas may be defined such that a mode in which antenna indexes 0, 1 and 2 (that is, three antennas) are used is changed to a mode in which antenna indexes 0, 1, 2 and 3 (that is, four antennas) are used, or vice versa. Alternatively, the change in the number of antennas may be defined such that a mode in which antenna indexes 0 and 1 (that is, two antennas) are used is changed to a mode in which antenna indexes 0, 1, 2 and 3 (that is, four antennas) are used, or vice versa. Alternatively, the change in the number of antennas may be defined such that a mode in which antenna index 0 (that is, one antenna) is used is changed to a mode in which antenna indexes 0, 1, 2 and 3 (that is, four antennas) are used, or vice versa. The relay node may implicitly become aware of a subframe, the link operation mode of which is changed, through subframe allocation signaling.

Table 4 shows signaling necessary for the case where the link operation mode of the relay node is changed from a specific link operation mode of a subframe having an index n to another link operation mode of a subframe having an index n+1.

TABLE 4

| SF#n | SF#n + 1 | | | |
|---|---|---|---|---|
| | Mode 1 | Mode 2 | Mode 3 | Mode 4 |
| Mode 1 | NA | Simple mode change | CTI (for Un UL) | FMI (for Un DL) |
| Mode 2 | Simple mode change | NA | FMI (for Uu DL) | CTI (for Uu UL) |
| Mode 3 | CTI (for Un UL) | FMI (for Uu DL) | NA | Simple mode change |
| Mode 4 | FMI (for Un DL) | CTI (for Uu UL) | Simple mode change | NA |

Referring to Table 4, mode change information needs to be signaled if the operation mode of the relay node is changed from the first mode of a subframe having an index n to the second mode of a subframe having an index n+1, a CTI for Un uplink needs to be signaled if the operation mode is changed to the third mode, and an FMI for Un uplink needs to be signaled if the operation mode is changed to the fourth mode. In addition, mode change information needs to be signaled if the operation mode of the relay node is changed from the second mode of a subframe having an index n to the first mode of a subframe having an index n+1, an FMI for Uu downlink needs to be signaled if the operation mode is changed to the third mode, and a CTI for Uu uplink needs to be signaled if the operation mode is changed to the fourth mode.

In addition, a CTI for Un uplink needs to be signaled if the operation mode of the relay node is changed from the third mode of a subframe having an index n to the first mode of a subframe having an index n+1, an FMI for Uu downlink needs to be signaled if the operation mode is changed to the second mode, and mode change information needs to be signaled if the operation mode is changed to the fourth mode. In addition, an FMI for Un downlink needs to be signaled if the operation mode of the relay node is changed from the fourth mode of a subframe having an index n to the first mode of a subframe having an index n+1, a CTI for Uu uplink needs to be signaled if the operation mode is changed to the second mode, and mode change information needs to be signaled if the operation mode is changed to the third mode.

Figure 18:
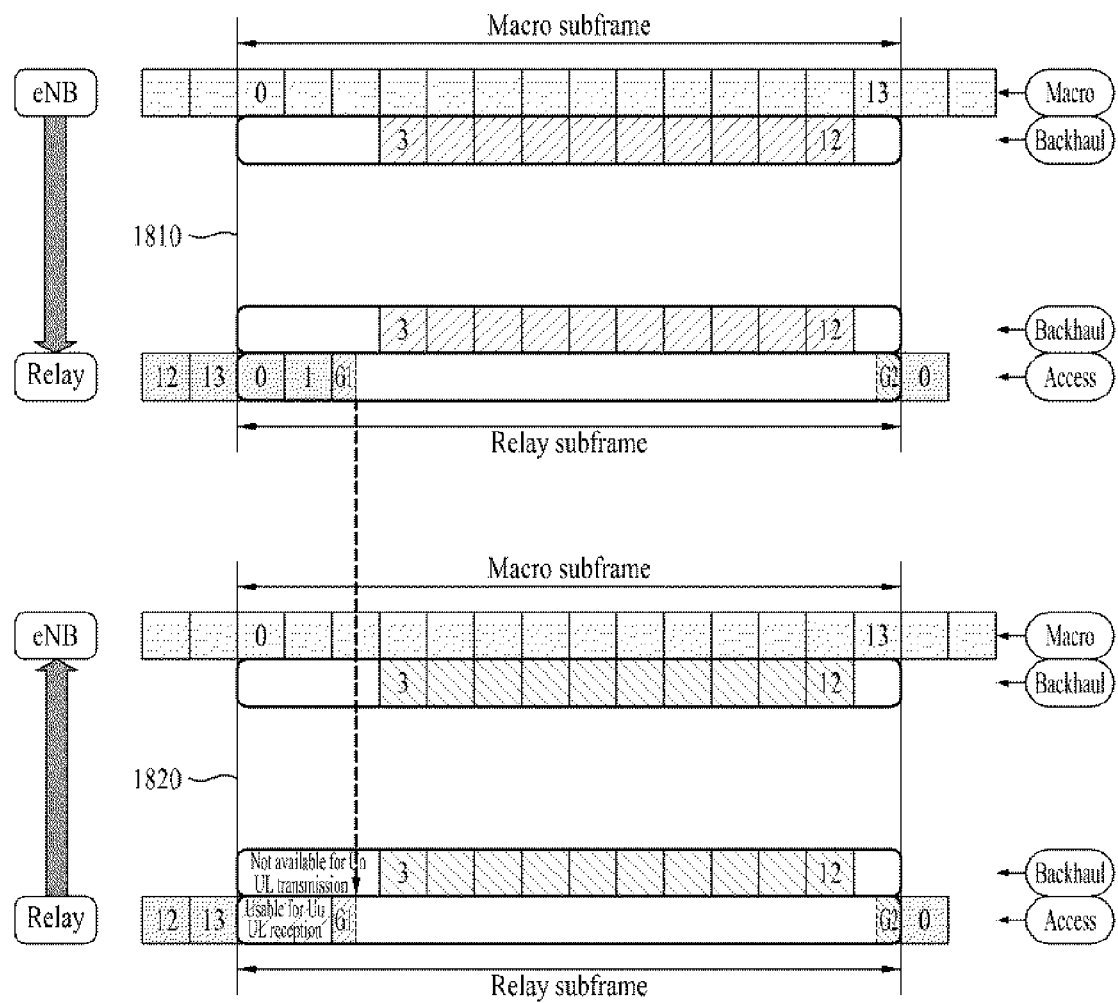
FIG. 18 is a diagram showing a frame structure between a base station (eNB) and a relay node if propagation delay is ignored.
Figure 19:
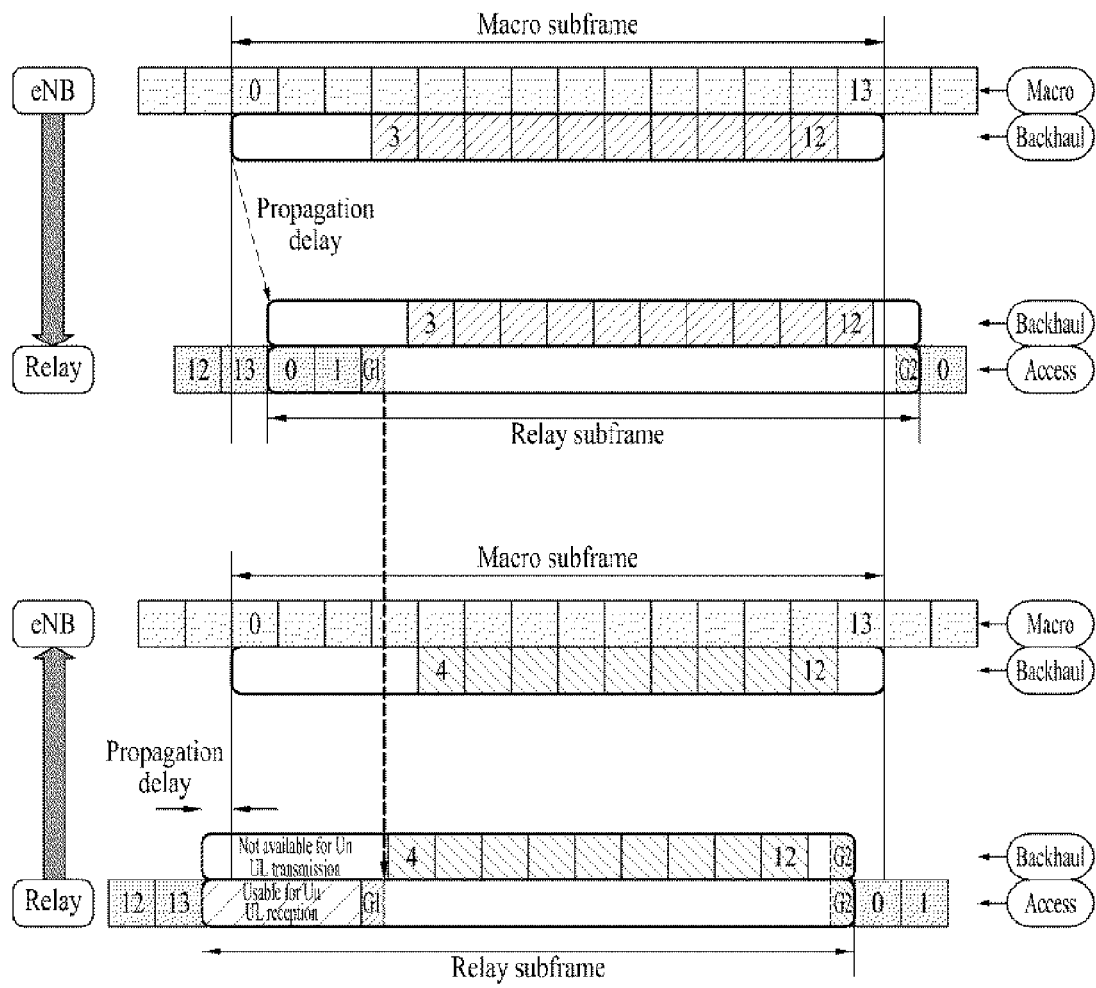
FIG. 19 is a diagram showing the structure of a frame between an eNB and a relay node if propagation delay is considered.

FIG. 18 is a diagram showing a frame structure between an eNB and a relay node if propagation delay is ignored, and FIG. 19 is a diagram showing the structure of a frame between an eNB and a relay node if propagation delay is considered.

The frame structure shown in FIG. 18 is shown to explain influence on a Un uplink subframe when the relay node operates in the first mode (shown in FIG. 17(*a*)) and the second mode (shown in FIG. 17(*b*)). If the relay node performs Uu downlink transmission through the first antenna, for example, if the relay node transmits a PDCCH to the UE at first and second symbols of the Uu downlink subframe, the relay node operates in the second mode shown in FIG. 17(*b*). In this case, the uplink transmission power amplifier can be used for the Uu link but cannot be used for Un uplink transmission, regardless of whether or not Uu uplink transmission is performed. Since the Un uplink transmission cannot be performed, as shown in FIG. 18, the number of symbols transmittable within a Un uplink subframe time is restricted.

As shown in FIG. 18, if propagation delay according to signal transmission between the eNB and the relay node does not occur, a Un downlink reception subframe boundary 1810 and a Uu downlink transmission subframe boundary 1820 are aligned in timing, and a Un uplink transmission subframe boundary 1810 and a Uu uplink reception subframe boundary 1820 are aligned in terms of timing, the maximum number of symbols transmittable by the relay node using the Un uplink subframe becomes 10. That is, the relay node may transmit a Un uplink signal through a maximum of 10 symbols corresponding to symbols having indexes 3 to 12 shown in FIG. 18.

However, as shown in FIG. 19, if propagation delay is considered, the maximum number of symbols transmittable by the relay node using the Un uplink subframe becomes 9. That is, the relay node may transmit a Un uplink signal through a maximum of 9 symbols corresponding to symbols having indexes 4 to 12 shown in FIG. 19.

Figure 20:
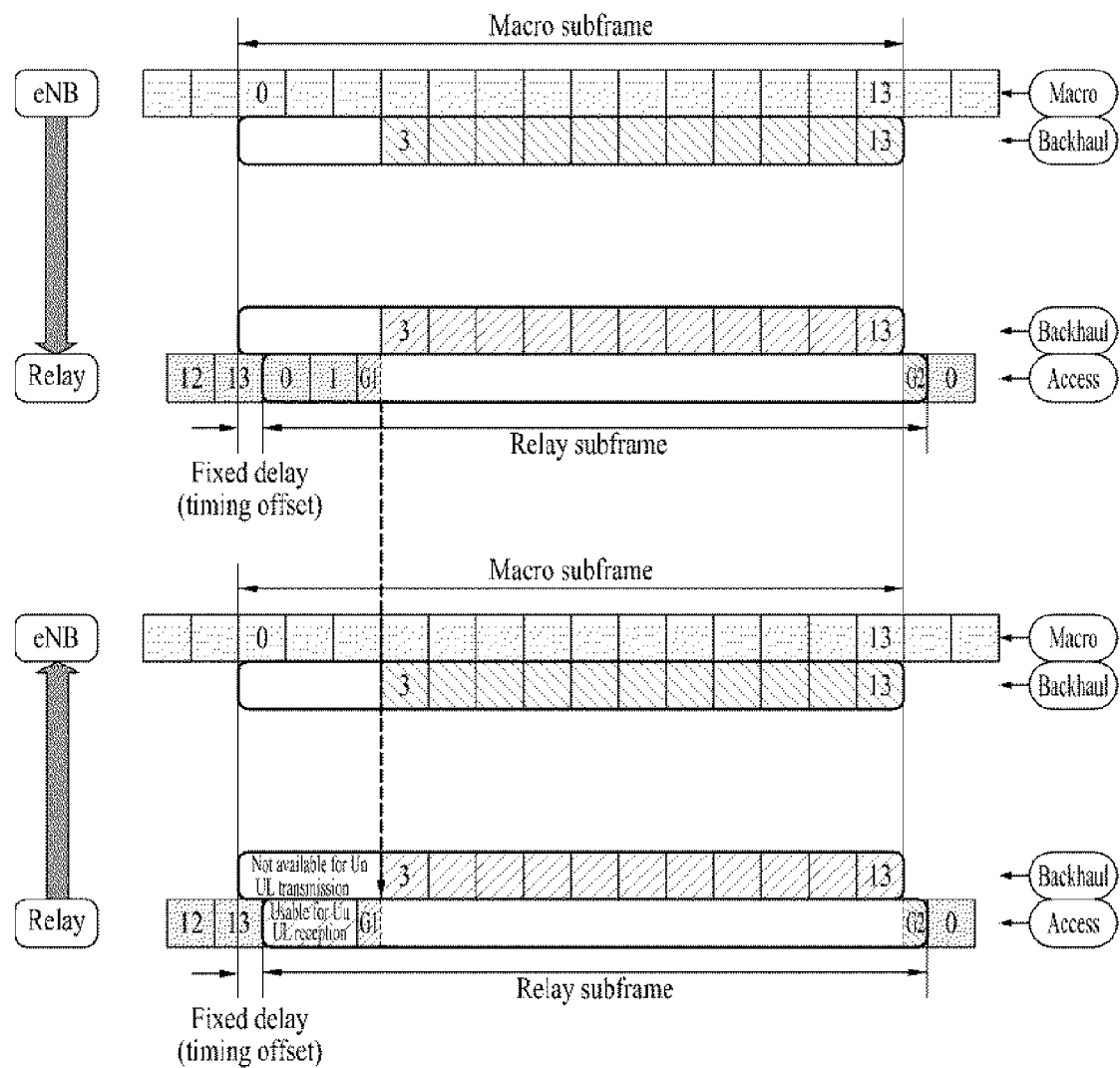
FIG. 20 is a diagram showing an example of a frame structure between an eNB and a relay node if propagation delay is ignored and a fixed timing offset is set.
Figure 21:
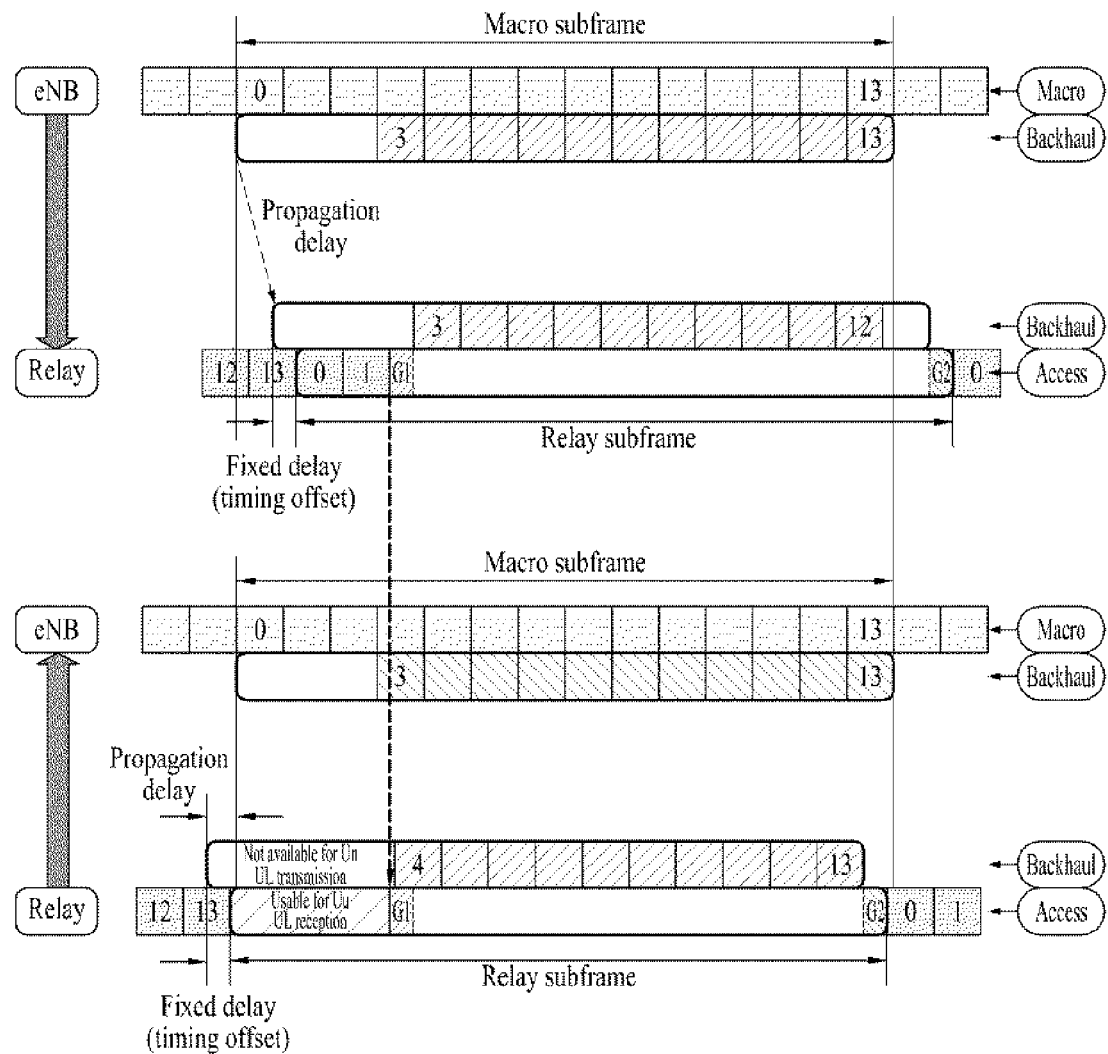
FIG. 21 is a diagram showing an example of a frame structure between an eNB and a relay node if propagation delay is considered and a timing offset is set.

FIG. 20 is a diagram showing an example of a frame structure between an eNB and a relay node if propagation delay is ignored and a fixed timing offset is set, and FIG. 21 is a diagram showing an example of a frame structure between an eNB and a relay node if propagation delay is ignored and a timing offset is set.

In the frame structures shown in FIGS. 20 and 21, the timing offsets are set in order to increase the number of symbols available in the same conditions as compared to the cases of FIGS. 18 and 19. In the frame structure shown in FIG. 20, the relay node may transmit a Un uplink signal through 11 symbols (symbols having indexes 3 to 13). In the frame structure shown in FIG. 21, the relay node may transmit a Un uplink signal through 10 symbols (symbols having indexes 4 to 13). However, if propagation delay is further increased, a timing adjustment value is further increased in Un uplink and thus more symbols may not be used.

In the frame structures shown in FIGS. 18 to 21, the change in the number of symbols of the Un uplink subframe may influence Relay-Physical Uplink Control Channel (R-PUCCH) transmission and multiplexing. More specifically, if R-PUCCH symbols are punctured, orthogonality between the R-PUCCH and the PUCCH may be damaged. In this case, in order to prevent the number of symbols from being changed, a method of always reserving one or two Un uplink transmission antennas for R-PUCCH transmission may be used.

Figure 22:
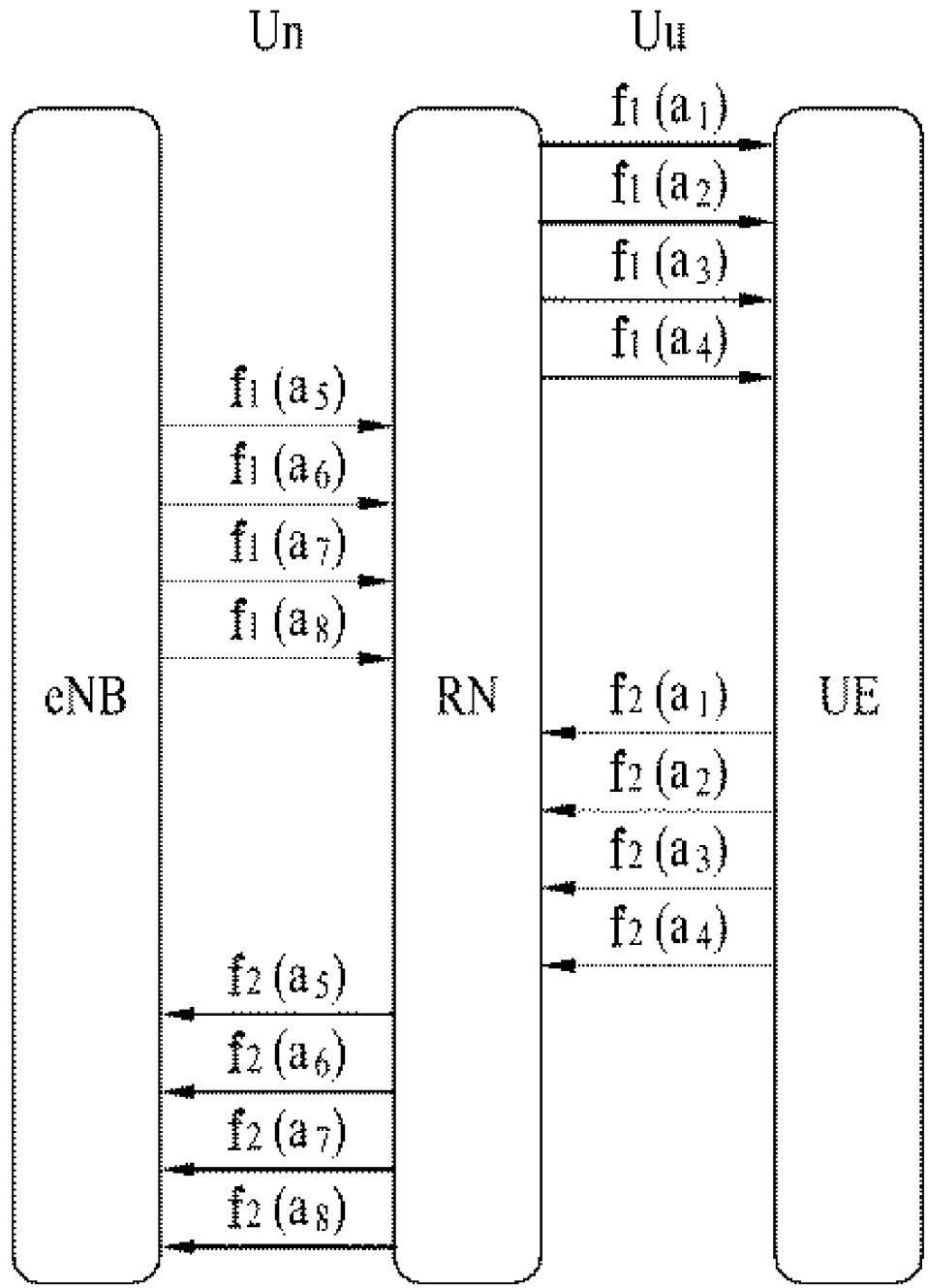
FIG. 22 is a diagram showing an example of a PUCCH/R-PUCCH or PUSCH/R-PUSCH transmission method.

FIG. 22 is a diagram showing an example of a PUCCH/R-PUCCH or PUSCH/R-PUSCH transmission method.

Referring to FIG. 22, if a seventh antenna a7 and an eighth antenna a8 are reserved as the Un uplink transmission antenna, the seventh antenna a7 and the eighth antenna a8 are always reserved as a pair of antennas for Un downlink reception. If the number of Un uplink transmission antennas is decreased and the number of Uu downlink transmission antennas is increased, a fifth antenna a5 and a sixth antenna a6 are configured to be used for the Uu link. Accordingly, in the example of FIG. 22, the number of Uu downlink transmission antennas may be increased to up to six. The reserved seventh antenna a7 and eighth antenna a8 may be used for Un uplink R-PUCCH transmission. Un uplink Relay-Physical Uplink Shared Channel (R-PUSCH) transmission may be reserved and used if necessary, like the R-PUCCH. However, the R-PUSCH may be transmitted using a shortened subframe structure, without reservation. Resources may be reduced due to symbols which are not available due to propagation delay.

If the relay node may simultaneously transmit the R-PUCCH and the R-PUSCH in the Un uplink, the R-PUCCH may be transmitted through the seventh antenna a7 and the eighth antenna a8 and the R-PUSCH may be transmitted through the other available antennas. Even in this case, the R-PUSCH cannot be transmitted through the first several symbols.

Figure 23:
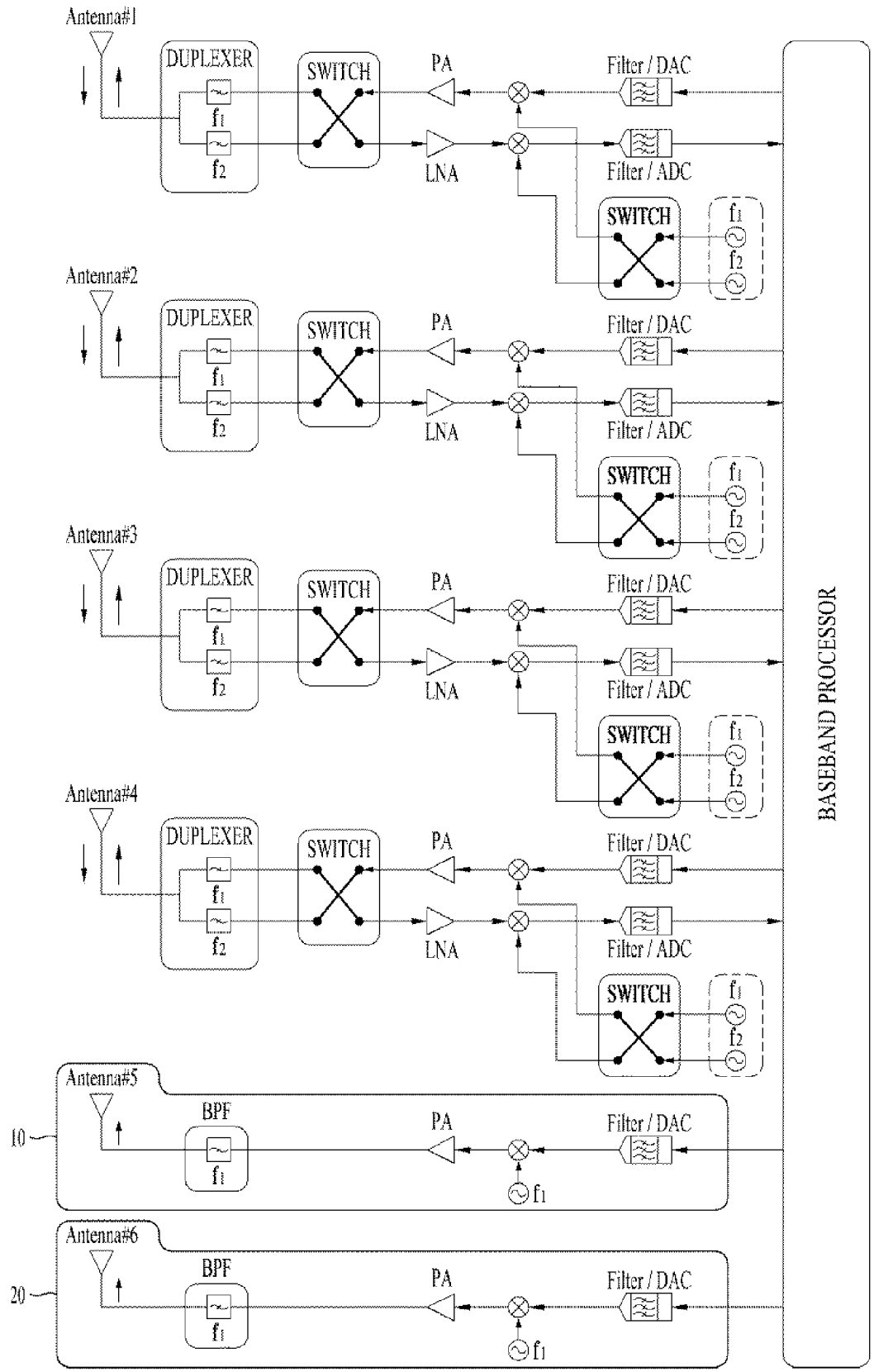
FIG. 23 is a diagram showing another example of the configuration of the relay node according to the present invention.

FIG. 23 is a diagram showing another example of the configuration of the relay node according to the present invention.

Referring to FIG. 23, the RF chain 2310 of the fifth antenna and the RF chain 2320 of the sixth antenna function as RF transmission modules. That is, the fifth antenna 5 and the sixth antenna 6 may be used to enable the relay node to perform Uu downlink transmission (e.g., PDCCH transmission) to the UE. If more antennas are necessary, the relay node may perform multi-antenna transmission using a combination of antennas.

Unlike the fifth and sixth antennas, each of the RF chains of the first to fourth antennas shown in FIG. 23 includes a duplexer, a transmission module and a reception module and is designed to be used for Un and Uu links. The configuration of the relay node is characterized in that the total number N_tx of transmission modules (including a PA) is greater than the total number N_rx of reception modules (including an LNA). That is, a greater number N_crs of Uu downlink transmission antennas may be designed.

In FIG. 23, the total number of reception modules is 4 (N_rx=4), the number of Uu downlink transmission antennas is 2 (N_crs=2), and the total number of transmission modules is 6 (N_tx=6) (here, N_tx=N_rx+Ncrs=6). In the case where a transceiver is included in one RF chain, if a transmitter transmits a signal using f_i (i=1, 2), a receiver must receive the signal only using f_j (i!=j=1, 2). However, the fifth and sixth antennas can transmit a Uu downlink PDCCH, a CRS, etc. without such a restriction.

Figure 24:
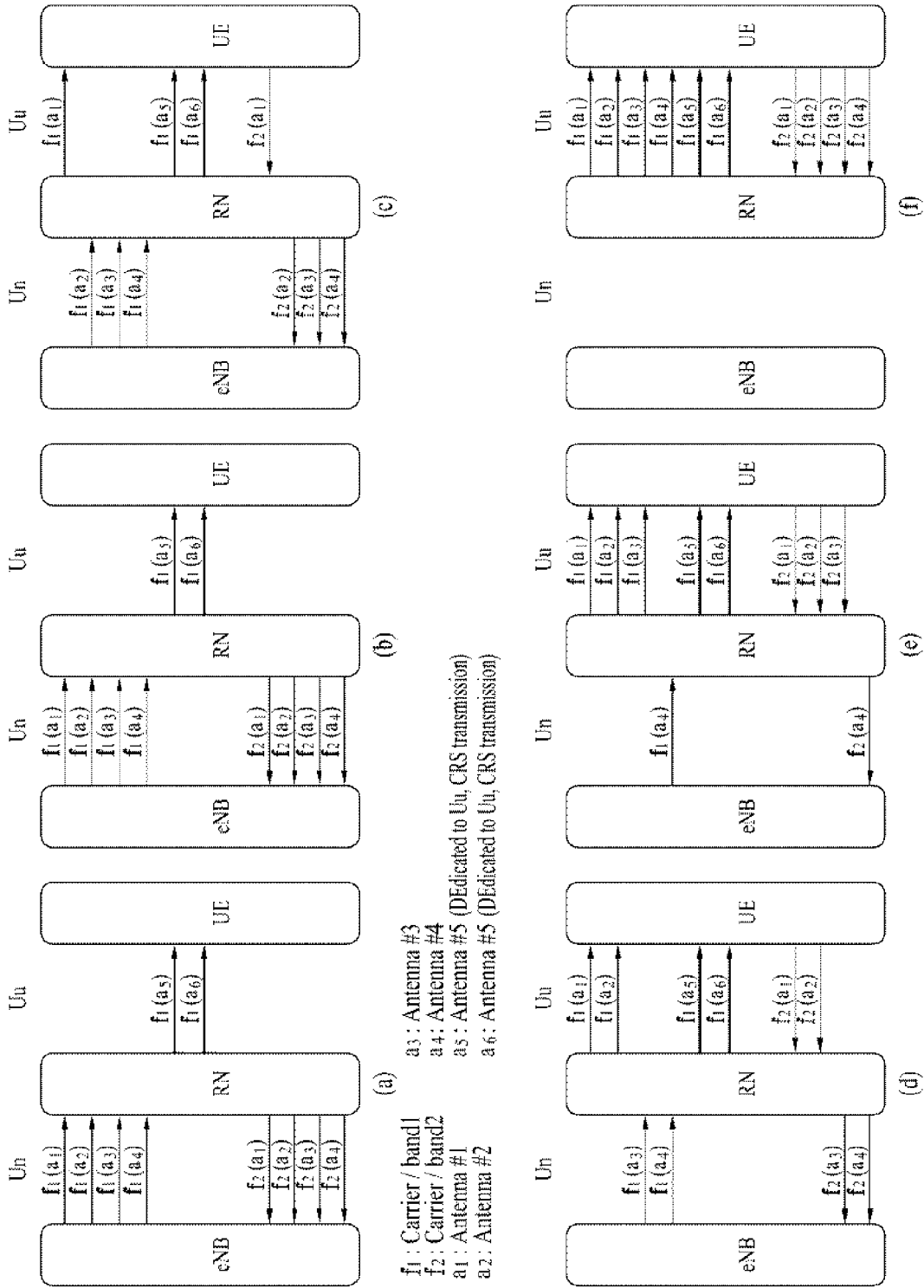
FIG. 24 is a diagram showing a signal transmission/reception mode of the relay node based on the configuration of the relay node shown in FIG. 23.

FIG. 24 is a diagram showing a signal transmission/reception mode of the relay node based on the configuration of the relay node shown in FIG. 23.

Referring to FIG. 24($a$), four antennas a1, a2, a3 and a4 may be used to enable the eNB to transmit the downlink signal of the frequency band $f_1$ in Un downlink and enable the relay node to transmit the uplink signal of the frequency band $f_2$ in Un uplink. In the relay node other than the half-duplex relay node, the remaining two antennas a5 and a6 may be used to enable the relay node to transmit the downlink signal of the frequency band $f_1$. The relay node may transmit a Uu downlink Common Reference Signal (CRS) through two antennas a5 and a6.

If the relay node is a half duplex relay node, the relay node operates in the modes shown in FIGS. 24($b$) and 24($c$). That is, the relay node does not perform a Un downlink reception operation but performs a Uu downlink transmission operation. Here, it is assumed that the half duplex relay node cannot simultaneously perform transmission and reception using the same frequency even when antennas used for Un link and Uu link are different (if spatial separation is not sufficient).

As shown in FIG. 24($b$), the relay node may operate in the mode for simultaneously transmitting a signal in Un link and Uu link. The relay node may transmit the uplink signal of the frequency band $f_2$ through the four antennas a1, a2, a3 and a4 in Un uplink and transmit the downlink signal of the frequency band $f_1$ through the two antennas a5 and a6 in Uu downlink.

FIG. 24($c$) shows an example of using the first antenna a1 in Uu downlink in addition to the fifth antenna a5 and the sixth antenna a6.

FIG. 24($d$) shows an example of using the first, second, fifth and sixth antennas a1, a2, a5 and a6 in Uu downlink. The relay node may perform Uu downlink transmission using four antennas a1, a2, a5 and a6. The CRS transmission of the relay node may be restricted to the fifth antenna a5 and the sixth antenna a6. The first antenna a1 and the second antenna a2 may be configured to transmit a Demodulation-Reference Signal (DM-RS) or the first, second, fifth and sixth antennas a1, a2, a5 and a6 may be configured to transmit a Channel State Information (CSI)-RS.

The relay node may use the four antennas a1, a2, a3 and a4 for Un uplink transmission in FIG. 24($b$), and the relay node may use only the two antennas a3 and a4 for Un uplink transmission as shown in FIG. 24($d$). If a transmission antenna is changed, the relay node and the base station need to share information regarding such change using a signaling method. The method proposed in association with FIG. 17 is applicable to FIG. 24.

As shown in FIG. 24($e$), the relay node may transmit a Uu downlink signal through the antennas a1, a2, a3, a5 and a6 and transmit a Un uplink signal through the fourth antenna a4. As shown in FIG. 24($f$), the relay node may use all the antennas a1, a2, a3, a4, a5 and a6 for Uu downlink transmission.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

MODE FOR THE INVENTION

Various embodiments have been described in the best mode for carrying out the invention.

INDUSTRIAL APPLICABILITY

The relay apparatus for transmitting and receiving the signal and the method thereof according to the embodiments of the present invention are applicable to a mobile communication system such as a 3GPP LTE system, a 3GPP LTE-A system or an IEEE 802 system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting and receiving a signal at a relay node (RN) in a wireless communication system, the method comprising:
   receiving information indicating a link mode in which the relay node will operate among a plurality of link modes; and
   transmitting the signal to at least one of a base station (BS) and a user equipment (UE) or receiving the signal from at least one of the base station and the user equipment based on the received information;
   wherein the plurality of link modes includes:
      a first mode in which all antennas of the RN are available for a backhaul link only and the RN simultaneously performs a transmission in the backhaul link using all of the antennas of the RN at a first frequency and a reception in the backhaul link using all of the antennas of the RN at a second frequency other than the first frequency,
      a second mode in which all of the antennas are available for an access link only and the RN simultaneously performs a transmission in the access link using all of the antennas of the RN at the first frequency and a reception in the access link using all of the antennas of the RN at the second frequency,
      a third mode in which all of the antennas are available for transmission only and the RN simultaneously performs a transmission in the backhaul link using half of the antennas of the RN at the first frequency and a transmission in the access link using a remaining half of the antennas of the RN at the second frequency, and
      a fourth mode in which all of the antennas are available for reception only and the RN simultaneously performs a reception the backhaul link using the half of the antennas of the RN at the first frequency and a reception in the access link using the remaining half of the antennas of the RN at the second frequency,
   wherein if the RN switches from the first mode to the third mode, a number of available antennas and a code book used for the backhaul link are changed.

2. The method according to claim 1, wherein the information indicating the link mode in which the relay node will operate corresponds to a subframe configuration information.

3. The method according to claim 1, further comprising switching to the link mode at a subframe indicated by the received information,
   wherein the signal is transmitted to or received from at least one of the base station and the user equipment at the subframe according to the switched link mode.

4. The method according to claim 1, wherein, if the received information indicates the first mode, the signal is transmitted to or received from only the base station via the backhaul link.

5. The method according to claim 1, wherein, if the received information indicates the second mode, the signal is transmitted to or received from only the user equipment via the access link.

6. The method according to claim 1, wherein, if the received information indicates the third mode, the signal is transmitted to the base station and the user equipment via the backhaul link and the access link.

7. The method according to claim 1, wherein, if the received information indicates the fourth mode, the signal is received from the base station and the user equipment via the backhaul link and the access link.

8. The method according to claim 1, wherein the received information includes information indicating a predefined codebook table corresponding to a number of transmission antennas available in the link mode or information indicating a feedback mode corresponding to a number of downlink transmission or downlink reception antennas available in the link mode.

9. The method according to claim 8, further comprising selecting a precoding matrix index (PMI) based on the information indicating the codebook table,
   wherein the signal to which the selected PMI is applied is transmitted to at least one of the base station and the user equipment.

10. The method according to claim 1, wherein the information is received through higher layer signaling.

11. A relay node (RN) apparatus for transmitting and receiving a signal in a wireless communication system, the RN apparatus comprising:
   a plurality of antennas configured to receive information indicating a link mode in which the relay node will operate among a plurality of link modes; and
   a processor configured to control the plurality of antennas to transmit or receive the signal to or from at least one of a base station and a user equipment based on the received information;
   wherein the plurality of link modes includes:
      a first mode in which all of the plurality of antennas are available for a backhaul link only and the RN simultaneously performs a transmission in the backhaul link using all of the antennas of the RN at a first frequency and a reception in the backhaul link using all of the antennas of the RN at a second frequency other than the first frequency, a second mode in which all of the plurality of antennas are available for an access link only and the RN simultaneously performs a transmission in the access link using all of the antennas of the RN at the first frequency and a reception in the access link using all of the antennas of the RN at the second frequency, a third mode in which all of the plurality of antennas are available for transmission only and the RN simultaneously performs a transmission in the backhaul link using half of the antennas of the RN at the first frequency and a transmission in the access link using a remaining half of the antennas of the RN at the second frequency, and a fourth mode in which all of the plurality of antennas are available for reception only and the RN simultaneously performs a reception in the backhaul link using the half of the antennas of the RN at the first frequency and a reception in the access link using the remaining half of the antennas of the RN at the second frequency, wherein if the RN switches from the first mode to the third mode, a number of available antennas and a code book used for the backhaul link are changed.

12. The RN apparatus according to claim 11, wherein the processor controls switching to the link mode at a subframe indicated by the received information, and the plurality of antennas transmit or receive the signal to or from at least one of the base station and the user equipment according to the switched link mode.

13. The RN apparatus according to claim 11, wherein the information indicating the link mode in which the RN apparatus will operate corresponds to a subframe.

14. The RN apparatus according to claim 11, wherein, if the received information indicates the first mode, the processor controls the plurality of antennas to transmit or receive the signal to or from only the base station via the backhaul link.

15. The RN apparatus according to claim 11, wherein, if the received information indicates the second mode, the processor controls the plurality of antennas to transmit or receive the signal to or from only the user equipment via the access link.

16. The RN apparatus according to claim 11, wherein, if the received information indicates the fourth mode, the processor controls the second number of the plurality of antennas to receive the signal from the base station and the user equipment via the backhaul link and the access link.

17. The RN apparatus according to claim 11, wherein the received information includes information indicating a predefined codebook table corresponding to a number of transmission antennas available in the link mode or information indicating a feedback mode corresponding to a number of downlink transmission or downlink reception antennas available in the link mode.

* * * * *